United States Patent [19]

Devaney

[11] Patent Number: 4,598,366

[45] Date of Patent: Jul. 1, 1986

[54] DIFFRACTION TOMOGRAPHY SYSTEMS AND METHODS WITH ARBITRARY SOURCE AND DETECTOR ARRAY SURFACES

[75] Inventor: Anthony J. Devaney, Ridgefield, Conn.

[73] Assignee: Schlumberger Technology Corporation, New York, N.Y.

[21] Appl. No.: 573,540

[22] Filed: Jan. 25, 1984

Related U.S. Application Data

[63] Continuation-in-part of Ser. No. 441,323, Nov. 12, 1982, Pat. No. 4,562,540, and a continuation-in-part of Ser. No. 533,391, Sep. 19, 1983.

[51] Int. Cl.$^4$ .................. G01V 5/00; G01N 29/00; G06F 15/42
[52] U.S. Cl. ..................................... 364/400; 73/602; 128/660; 250/256; 364/414; 364/421; 364/422; 378/901
[58] Field of Search ............... 364/414, 420, 421, 422, 364/400; 73/602; 250/253, 256, 269; 128/660; 367/14; 378/4, 901

[56] References Cited

U.S. PATENT DOCUMENTS 4,214,226 7/1980 Narasimhan et al. ............... 181/102

OTHER PUBLICATIONS

Kaveh, M. et al., "Ultrasonic Tomography Based on Perturbation Solutions", *Computer Graphics and Image Processing*, vol. 9, No. 2, 1979, 105–116.
Adams, M. F. et al., "Tomography from Multiview Ultrasonic Diffraction Data: Comparison with Image Reconstruction from Projections", *Acoustical Imaging*, Plenum Press (New York), vol. 10, 1982, 365–380.
Pan, S. X. et al., "A Computational Study of Reconstructive Algorithms for Diffraction Tomography: Interpolation Versus Filtered Backpropagation", *IEEE Trans. Acoust., Speech, Signal Processing*, vol. ASSP-31, No. 5, Oct. 1983, 1262–1275.
Norton, S. J. et al., "Ultrasonic Reflectivity Imaging in Three Dimensions: Exact Inverse Scattering Solutions for Plane, Cylindrical, and Spherical Apertures", *IEEE Transactions on Biomedical Engineering*, vol. BME-28, No. 2, Feb. 1981, 202–220.
Fercher, A. F. et al., "Image Formation by Inversion of Scattered Data Field: Experiments and Computational Simulation", *Applied Optics*, vol. 18, No. 14, Jul. 15, 1979, 2427–31.
Mueller, R. K. et al., "Reconstructive Tomography and Applications to Ultrasonics", *Proceedings of the IEEE*, vol. 67, No. 4, Apr. 1979, 567–587.
Kaveh, M. et al., "A Comparison of Born and Rytov Approximations in Acoustic Tomography", *Acoustical Imaging*, vol. 2, ed. by John P. Powers, Plenum Press, NY, 1982, 325–35.
Devaney, A. J., "A Filtered Backpropagation Algorithm for Diffraction Tomography", *Ultrasonic Imaging* 4, 1982.
Adams, M. F. et al., "Synthetic Aperture Tomographic (SAT) Imaging for Microwave Diagnostics", *IEE Proceedings*, vol. 129, Part H, No. 2, Apr. 1982.
Devaney, A. J., "Inverse-Scattering Theory Within the Rytov Approximation", *Optics Letters*, vol. 6, No. 8, Aug. 1981, 374–6.
Devaney, A. J., "A New Approach to Emission and Transmission CT", 1980 *Ultrasonics Symposium Proceedings*, vol. 2, Nov. 1980, 979–83.

*Primary Examiner*—Jerry Smith
*Assistant Examiner*—Clark A. Jablon
*Attorney, Agent, or Firm*—David P. Gordon; Stephen L. Borst

[57] ABSTRACT

Diffraction tomography systems and methods are disclosed for the reconstruction of physical properties of two and three-dimensional objects from information collected by detectors located along an arbitrary surface in space. The sources of energy investigating the object may likewise be located along an arbitrary surface. Optimal filtered backpropagation techniques and preprocessing required for such reconstructions are disclosed for systems utilizing plane wave sources, and for systems using fan beam cylindrical or spherical wave insonification. The preprocessing and filtered backpropagation techniques are shown to simplify for the cases of circular boundaries, and other separable boundaries within the Helmholtz equation.

42 Claims, 4 Drawing Figures

DIFFRACTION TOMOGRAPHY SYSTEMS AND METHODS WITH ARBITRARY SOURCE AND DETECTOR ARRAY SURFACES

A continuation-in-part of copending application Ser. No. 441,323, now U.S. Pat. No. 4,562,540, entitled "Diffraction Tomography Systems and Methods" filed on Nov. 12, 1982 and of copending application Ser. No. 533,391 entitled "Diffraction Tomography Systems and Methods with Fixed Detector Arrays" filed on Sept. 19, 1983. The entire texts of both Ser. Nos. 441,323, now U.S. Pat. No. 4,562,540, and 533,391 are hereby incorporated by reference herein.

BACKGROUND

This invention relates to systems and methods for reconstructing acoustic and/or electromagnetic properties of objects with diffraction tomographic procedures using filtered backpropagation techniques wherein the sources of acoustic and/or electromagnetic energy may be located on any arbitrary surface totally or partially surrounding the object, and the detectors of such energy likewise may be located on any arbitrary surface totally or partially surrounding the object.

For purposes of this application and the claims herein, it should be understood that the waves of energy which propagate and diffract according to the invention include but are not limited to sonic or electromagnetic waves. The term "sonic wave" shall be interpreted as broadly as possible and shall be understood to include all elastic wave phenomena in liquid and solid materials including, but not limited to, acoustic, compressional, shear, and elastic waves. The term "acoustic wave" shall be interpreted herein to be the equivalent of "sonic wave". The term "electromagnetic wave" shall be interpreted in its broadest sense and shall include, but not be limited to infrared rays, X-rays, and the class known as "optics".

Further, for purposes of this application, the term "arbitrary surface" shall be understood in its broad sense and shall include all surfaces as well as the term "boundary".

More particularly, this invention relates to diffraction tomographic procedures using filtered backpropagation techniques where the plane wave or fan beam (cylindrical or spherical wave) sources and the detectors are located on arbitrary surfaces, and the object of reconstruction may be either a two or three dimensional body.

In the special cases where the detector surface used in the invention is as infinite plane on one side of the object, the methods reduce to the fixed detector plane invention disclosed in copending Ser. No. 533,391. If the single detector plane is allowed to rotate so as to remain perpendicular to the source of energy, the method reduces to the classical ultrasound diffraction tomographic technique described in copending Ser. No. 441,323.

As disclosed in Ser. No. 441,323, computer-aided diffraction tomography which attempts to account for the diffraction of acoustic energy as it propagates through a body of interest has been known in the art. While the proposed solutions prior to Ser. No. 441,323 were inadequate as regards reconstruction accuracy or practicality, the backpropagation filter and filtered backpropagation technique disclosed in Ser. No. 441,323, permitted the tomographic reconstruction of an investigated object with a practical accurate system and method which properly accounted for the diffraction of acoustic and/or electromagnetic waves propagating through an object. The detailed disclosure in Ser. No. 441,323 described ultrasound embodiments with coplanar sources and detectors which simultaneously rotated around the object, and provided the basis for the use of backpropagation filters and filtered backpropagation techniques in the diffraction tomography arts. The Background section of Ser. No. 441,323 also provided some of the theoretical foundations of filtered backpropagation.

Copending Ser. No. 533,391 expanded upon Ser. No. 441,323 to provide optimal reconstructions where the detector array was fixed in space such that the sources and detectors were non-coplanar, and discussed slant stack procedures for generating insonifying plane waves having various angles of insonfication from a fixed cylindrical wave source array. Also, among other things, Ser. No. 533,391 provided a method for the direct three-dimensinal reconstruction of an object.

While Ser. Nos. 441,323 and 533,391 provided the groundwork for making the field of ultrasound diffraction tomography viable, the systems and methods discussed therein described particular geometries. Others working with filtered backpropagation in the acoustic tomography arts such as M. F. Adams and A. P. Anderson; "Synthetic Aperture Tomographic Imaging for Microwave Diagnostics", IEE: (England, April, 1982), have disclosed nothing more than the simplest geometry of Ser. No. 441,323 which is not always practicable or desirable.

SUMMARY

It is therefore an object of this invention to provide methods and systems for the tomographic reconstruction of objects using filtered backpropagation techniques wherein the source energy is generated from sources over an arbitrary surface and the detectors of such energy are located on an arbitrary surface.

It is another object of this invention to provide methods and systems for the tomographic reconstruction of two and three dimensional objects using filtered backpropagation techniques wherein the sources of energy approximate plane waves and are located on an arbitrary curvilinear surface, and the detectors are located on an arbitrary curvilinear surface.

It is yet another object of this invention to provide methods and systems for the tomographic reconstruction of two or three dimensional objects using filtered backpropagation techniques wherein the source of energy are either spherical or cylindrical waves and the sources and detectors are located on arbitrary curvilinear surfaces.

Yet another object of this invention is to provide methods and systems for the tomographic reconstruction of objects using filtered backpropagation techniques wherein the fan beam sources and the detectors are located in circular or spherical boundary geometries.

In accordance with the objects of the invention, the diffraction tomographic methods and systems disclosed herein provide increased capabilities as compared to Ser. Nos. 441,323 and 533,391, as the sources and detectors are permitted to be located along arbitrary surfaces. Preprocessing and filtered backpropagation techniques required for optimal object reconstructions are accordingly provided. In a first embodiment, the insonifying sources are plane wave sources or the equivalent thereof. After the plane waves have interacted with the investigated object, the scattered fields detected along the arbitrary detecting surface are preprocessed with a general transform and then processed according to a filtered backpropagation technique to provide a partial reconstruction of the object. By summing over view angles, a full reconstruction is obtained.

The filtered backpropagation technique utilized according to this invention differs in form from those utilized in copending parent applications Ser. Nos. 441,323, and 533,391 in that, in general, it does not comprise a convolution of filters. However, according to the invention, if one desires to use the identical backpropagation filters and filtered backpropagation techniques of the parent applications, the preprocessing required may be changed such that a unit vector s utilized in the general transform and the filtered backpropagation technique is chosen to be limited in the directions it can assume.

In a second embodiment, the sources located on an arbitrary surface are spherical or cylindrical (fan beam) wave sources or approximations thereto. In this embodiment, the scattered field amplitude responses detected by the detectors on an arbitrary surface are preprocessed by slant stacking the detected signals to provide a plane wave response which may then be processed according to the filtered backpropagation technique of the first set of embodiments summarized above. The partial reconstructions so obtained are then summed over view angles to provide a full reconstruction. Thus, the second embodiment can be seen as a quasi-fan beam embodiment, as the sources are of a fan beam nature, but the preprocessing and filtered backpropagation technique are that of the plane wave embodiment.

As an alternative to preprocessing by slant stacking and using the filtered backpropagation technique of the plane wave embodiments, a single operation is provided which is the diffraction tomographic equivalent to the fan beam filtered backprojection algorithm of X-ray tomography. Thus, a third embodiment ("true fan beam") includes a filtered backpropagation technique which operates directly on the obtained spherical or cylindrical wave scattered field data to provide a partial reconstruction of the object. A full reconstruction is provided by summing over source points rather than view angle. Thus, in this fan beam embodiment, rather than constructing a plane wave response and using the filtered backpropagation technique of the embodiments summarized above, each source is treated separately and the data received by all the detectors due to that one source is processed to provide a partial reconstruction. A full reconstruction of the object is obtained by adding the reconstructions, i.e. by summing over all source points.

While the embodiments summarized above and described hereinafter in the Detailed Description apply to two-dimensional objects, the techniques described are readily extended to three dimensions by techniques utilized in aforementioned copending Ser. Nos. 441,323 and 533,391. Thus, as in Ser. No. 441,323, the scattered field measurements performed along a two-dimensional surface may be projected onto a boundary surface and then processed to provide a three-dimensional reconstruction. If such a technique is used, a sequence of experiments employing measurement surfaces having different orientations relative to the body under investigation is required for full three-dimensional reconstructions. Alternatively, the theories, algorithms, and techniques used in the invention may be readily extended to their three-dimensional equivalents.

DETAILED DESCRIPTION OF THE PREFERRED EMBODIMENT

PLANE WAVE ARBITRARY SURFACE DIFFRACTION TOMOGRAPHY

Figure 1:
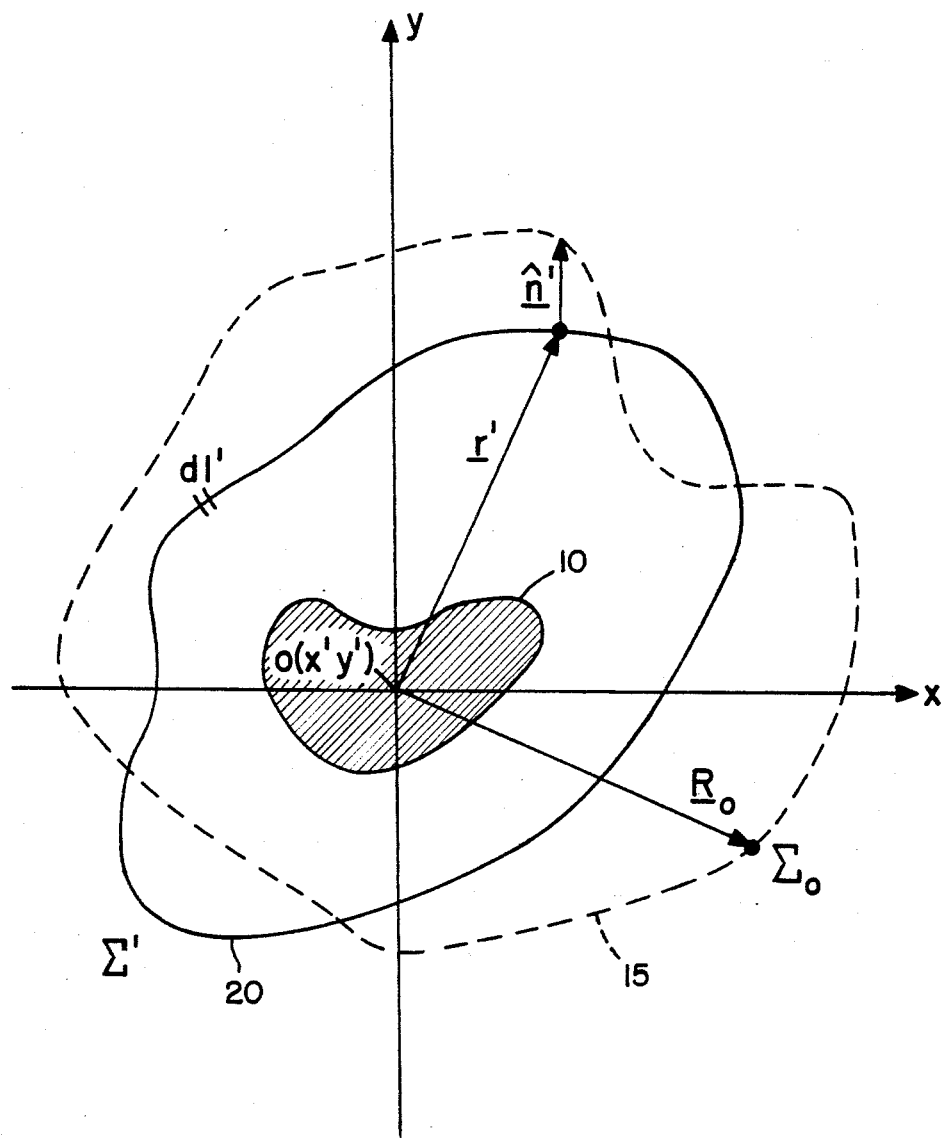
FIG. 1 illustrates the geometry of diffraction tomography with arbitrary sources and receiver surfaces.

Turning to FIG. 1, the geometries of diffraction tomography with arbitrary source and receiver surfaces may be seen. The object 10 is ideally embedded in a homogeneous isotropic medium and is surrounded by an arbitrary curvilinear source surface $\Sigma_o$ indicated on FIG. 1 as 15, and an arbitrary curvilinear receiver surface $\Sigma'$ indicated as 20. $R_o$ is the vector from the coordinate system origin, preferably chosen to be near the "center" of object 10, to a particular source on surface 15, while $r'$ is the vector from the coordinate system origin to a particular detector on surface 20. The outward unit vector normal to $\Sigma'$ is represented by $\hat{n}'$, while $dl'$ is a differential length on surface 20. The vector $s_o$ is the unit propagation vector of the plane wave originating from the sources on surface 15, while s is a unit vector which can assume all directions. As will be explained hereinafter, the choice of vector s may be very important, as the filtered backpropagation technique utilized in reconstructing the object 10 can be simplified to be identical to those filtered backpropagation techniques used in copending Ser. Nos. 441,323 and 533,391 if s is chosen properly.

Figure 2:
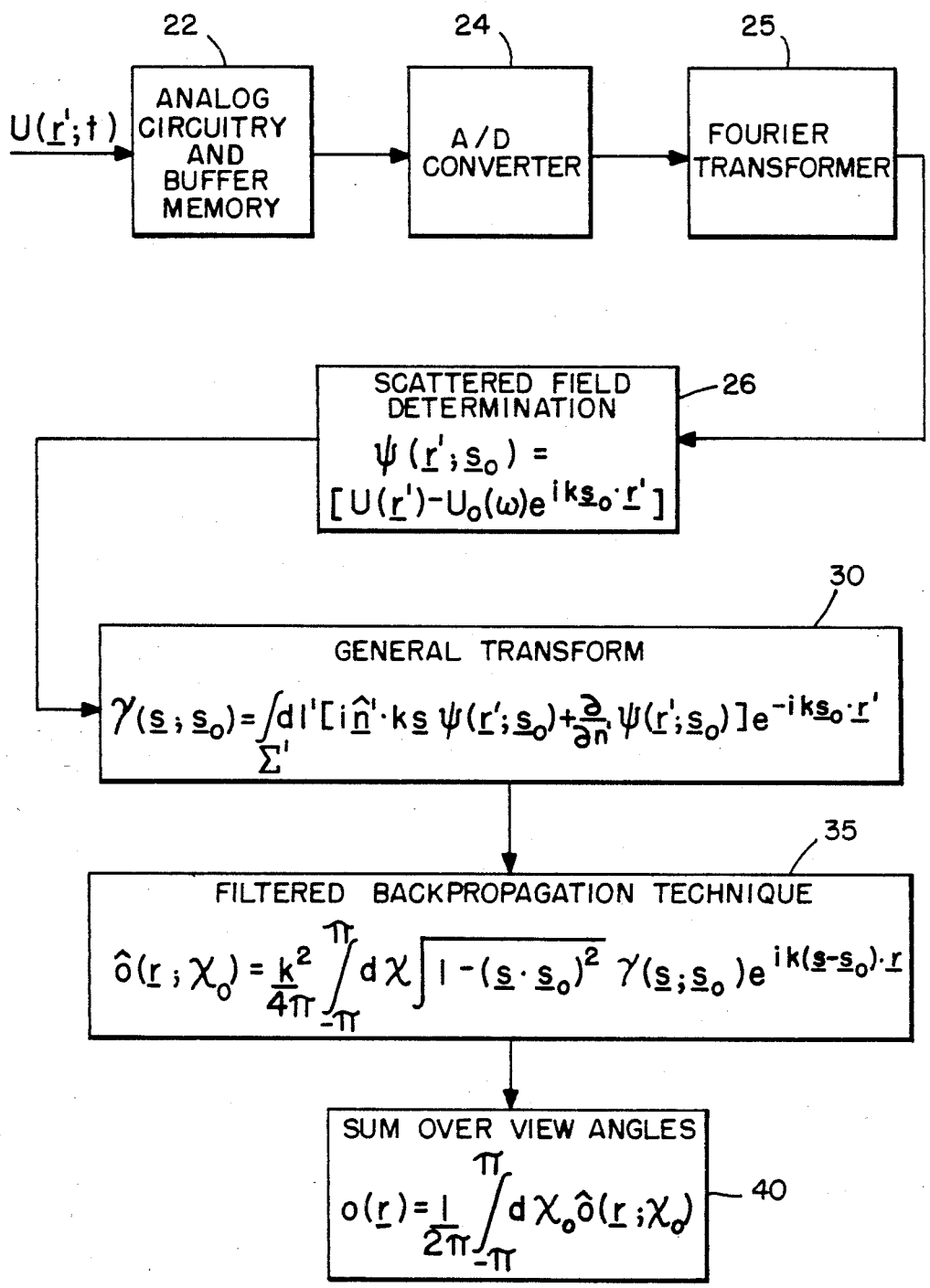
FIG. 2 is a block diagram of the preprocessing and the filtered backpropagation technique performed on detected signals for the reconstruction of the object when the arbitrary source surface contains plane wave sources.

If the sources of electromagnetic or sonic energy located along surface 15 are plane wave sources or approximations thereto, the block diagram of FIG. 2 represents the best mode preprocessing and filtered backpropagation technique for reconstructing the properties of object 10. When an incident plane wave, exp-$(iks_o \cdot r)$, from a source located along surface 15 interacts with object 10, the resulting fields are detected by detectors located along surface 20. The total detected field $U(r'; t)$ is preprocessed through conventional analog circuitry and buffer memory 22, and is then converted from analog to digital form by A/D converter 24. After the digital signals are Fourier transformed in time at 25, the scattered field $\Psi(r'; s_o)$ is then calculated within the Born approximation at 26 according to $$\Psi(r'; s_o) = [U(r') - U_o(\omega)e^{iks_o \cdot r'}] \qquad (1)$$

where $U(r')$ is the total field, k is the wavenumber at frequency $\omega$, and $U_o(\omega)e^{iks_o \cdot r'}$ is the insonifying plane wave at measurement point r' and at frequency $\omega$. Within the Born approximation, the scattered field is characterized by its amplitude. Of course, if desired, the scattered field can be derived within the Rytov approximation such that the scattered field is characterized by its phase. Thus, the amplitude of the scattered field would be replaced with the Rytov phase according to methods and equations disclosed in copending application Ser. Nos. 441,323 and 533,391. As discussed in those applications, if the Rytov approximation is used, complex phase converting and phase unwrapping are necessary.

Returning to FIG. 1, the plane wave scattering amplitude, $\gamma(s; s_o)$, is derived at 30 from the determined scattered field according to the general transform $$\gamma(s;s_o) = \int_{\Sigma'} dl' \left[ in' \cdot ks\psi(r';s_o) + \frac{\partial}{\partial n'} \psi(r';s_o) \right] e^{-iks_o \cdot r'} \quad (2)$$

where $\hat{n}'$ is the unit outward normal vector to surface $\Sigma'$ at point r', and $$\frac{\partial}{\partial n'}$$

denotes the derivative along the $\hat{n}'$ direction. Transform (2) is used instead of the Fourier transforms used directly before the filtered backpropagation techniques in copending Ser. Nos. 441,323 and 533,391 because Fourier transforms are not appropriate transforms for general curvilinear surfaces.

Because in most applications it is difficult to measure both $\Psi(r'; s_o)$ and $$\frac{\partial}{\partial n'} \psi(r'; s_o),$$

it is important to note that transform (2) may be simplified in certain circumstances. Thus, it is possible to obtain an exact relationship between the plane wave scattering amplitude $\gamma(s; s_o)$ and either $\Psi(r'; s_o)$ or $$\frac{\partial}{\partial n'} \psi(r'; s_o)$$

when the detection boundaries coincide with one of the coordinate axes of a curvilinear coordinate system in which the Helmholtz equation separates. Important examples of such boundaries are circles and infinite straight lines. For an infinite straight line, when $n' \cdot s \geq 0$, the integrals involving $\psi(r'; s_o)$ and $$\frac{\partial}{\partial n'} \psi(r'; s_o)$$

are equal and thus transform (2) simplifies to $$\gamma(s;s_o) = 2ikn' \cdot s \int_{-\infty}^{\infty} dl' \psi(l';s_o)e^{-iks_o \cdot r'} \quad (3)$$

where $\Psi(l', s_o)$ denotes the scattered field evaluated on the measurement line. When $\hat{n}' \cdot s < 0$, the integral involving $\Psi(r'; s_o)$ exactly cancels the integral involving $$\frac{\partial}{\partial n'} \psi(r'; s_o).$$

For the case of a circular boundary, transform 2 reduces to $$\gamma(s;s_o) = 4i \int_0^{2\pi} d\sigma \psi(\sigma;s_o)F_R(\chi - \sigma) \quad (4)$$

where R is the radius of the measurement circle $\Sigma'$ assumed to be centered at the origin, and $\sigma$ and $\chi$ are, respectively, the angles made by r' and s with an arbitrary reference direction. $\psi(\sigma; s_o)$ denotes the scattered field at the angle $\sigma$ and the function $F_R(x)$ is given by $$F_R(x) = \frac{1}{(2\pi)^2} \sum_{n=0}^{\infty} \frac{i^n}{H_n(kR)} e^{inx} \quad (5)$$

where $H_n$ is the n'th order Hankel function of the first kind. It should be noted that the center and radius of $\Sigma'$ can be changed as a function of the insonifying wave vector $s_o$, such that a sequence of measurement boundaries, up to one for each value of $s_o$, may be employed.

If an arbitrary detection boundary has a weak curvature such that it can be approximated by a straight line in the vicinity of each point (i.e. the local radius of curvature is much larger than a wavelength), an approximate expression for $\gamma(s, s_o)$ may be employed. In this weak curvature case, transform 2 reduces as:

$$\gamma(s,s_o) \approx 2ik \int_{\Sigma'} dl' n' s \psi(r';s_o)e^{-iks_o \cdot r'} \quad (6)$$

The scattering amplitude $\gamma(s, s_o)$ of an acoustic object may be defined and shown to be proportional to the spatial Fourier transform of the object profile evaluated on circles in Fourier space which are the two-dimensional analogues of the well known Ewald spheres of X-ray crystallography. The scattering amplitude should therefore be recognized as the key input into the filtered backpropagation technique, as within the Born approximation the plane wave scattering amplitude is related to the two-dimensional Fourier transform of the object profile via the generalized projection slice theorem. Thus, since similar considerations apply within the Rytov approximation, an estimate of the object profile may be reconstructed from the plane wave response as discussed in copending Ser. No. 441,323.

In order to obtain a partial reconstruction, $\hat{O}(r; \chi_o)$, of the object 10, the plane wave scattering amplitude is filtered and backpropagated according to the filtered backpropagation technique:

$$O(r;\chi_o) = \frac{k^2}{4\pi} \int_{-\pi}^{\pi} d\chi \sqrt{1 - (s \cdot s_o)^2} \, \gamma(s;s_o)e^{ik(s-s_o) \cdot r} \quad (7)$$

where $\chi_o$ and $\chi$ are respectively the angles formed by $s_o$ and s with a fixed reference direction. The filtered backpropagation technique for plane wave illumination with an arbitrary receiver surface does not generally separate out into its usual implementation as a convolution of a backpropagation filter and a deblurring filter (as discussed and claimed in copending Ser. Nos. 441,323 and 533,391). Nevertheless, the process (7) disclosed above is a filtered backpropagation technique for diffraction tomography as it takes the complex amplitude of the wave and filters and backpropagates it into the object space in order to partially reconstruct an object. Of course, the same filtered backpropagation technique applies to a method utilizing the Rytov approximation if the scattered field is expressed in terms of the phase of the total field as previously discussed.

In the special case when the receiver surface 15 comprises two infinite parallel planes on either side of the object, then the filtered backpropagation technique separates into a convolution of a deblurring and backpropagation filters. If only one of the two infinite planes is utilized, the filtered backpropagation technique reduces to the fixed detector plane filtered backpropagation technique disclosed in Ser. No. 533,391. If the single detector plane is allowed to rotate, always remaining perpendicular to unit propagation vector $s_o$, then the technique reduces to the basic ultrasound diffraction tomographic technique described in Ser. No. 441,323. Alternatively, by choosing unit vector s appropriately, the plane wave response $\gamma(s; s_o)$ will be put into such a form such that the filtered backpropagation techniques of Ser. Nos. 441,323 and 533,391 may be identically utilized. Thus, it will be seen that if it is desirable to use the filtered backpropagation technique of Ser. No. 441,323, $\chi$ may be allowed to go from $\chi_o - \pi/2$ to $\chi_o + \pi/2$. If the backpropagation technique of the fixed detector array diffraction tomography disclosure is desirable, angle $\chi$ may go from $-\pi/2$ to $\pi/2$.

Following processing according to any of the filtered backpropagation techniques, a full two-dimensional reconstruction may be obtained by summing the partial reconstructions over all angles such that $$O(r) = \frac{1}{2\pi} \int_{-\pi}^{\pi} d\chi_o O(r;\chi_o) \tag{7a}$$

as seen at 40 of FIG. 2. If $\chi_o$ is chosen as to be permitted to go from $-\pi/2$ to $\pi/2$ as may be seen from FIG. 3 of copending Ser. No. 533,391 (Note that the z axis therein is equivalent to the x axis herein), the integral over $\chi_o$ in (7a) is limited. Likewise, if $\chi$ is chosen to go from $\chi_o - \pi/2$ to $\chi_o + \pi/2$, as in copending Ser. No. 431,323, the summation over $\chi$ in filtered backpropagation technique (7) is also limited.

FAN BEAM ARBITRARY SURFACE DIFFRACTION TOMOGRAPHY

Figure 3:
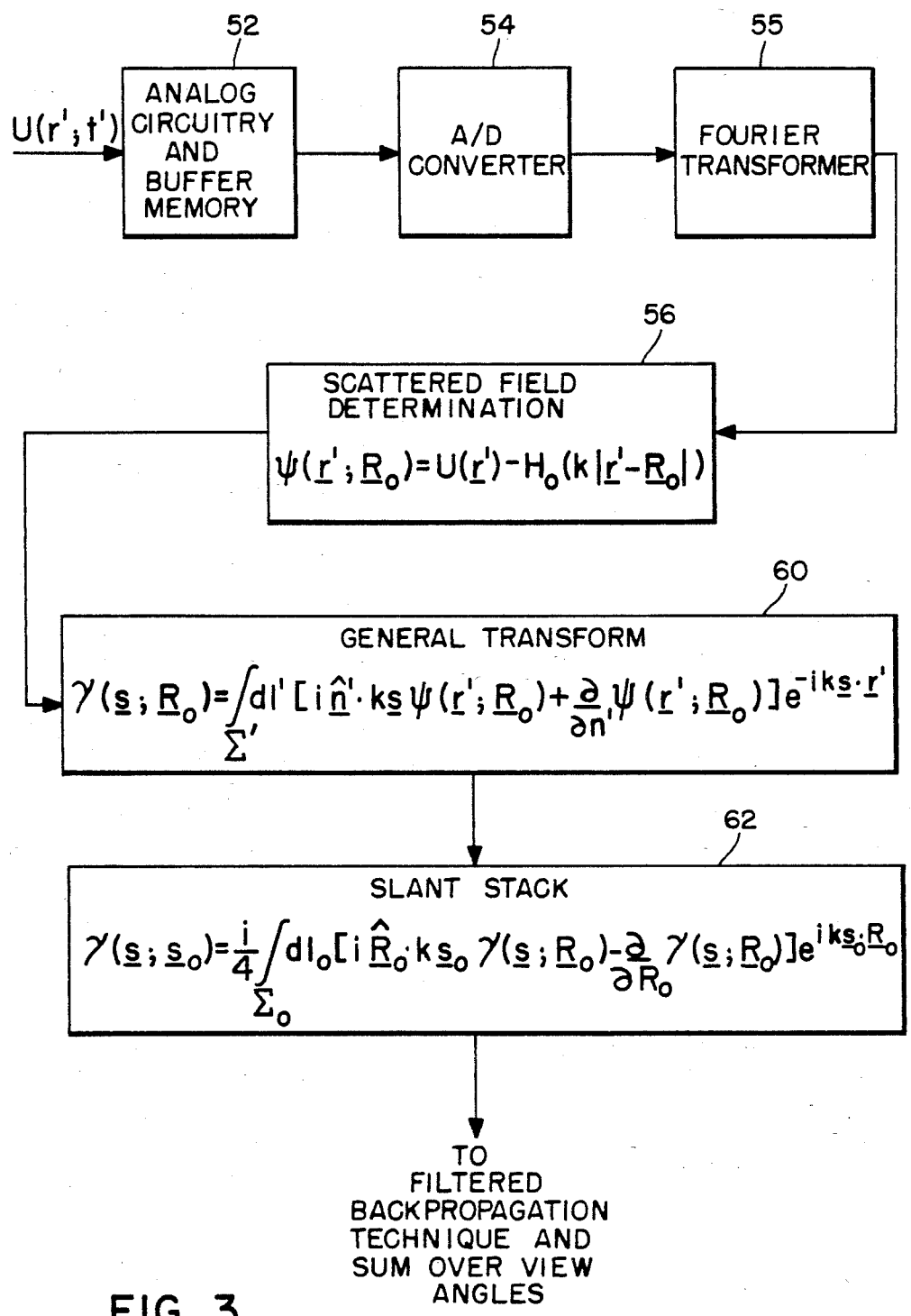
FIG. 3 is a block diagram for the additional preprocessing performed when the arbitrary source surface contains cylindrical wave sources.

If the sources along transmitter surface 15 generate cylindrical or spherical waves rather than plane waves, the preprocessing disclosed above may be altered to permit proper reconstruction. Thus, as seen in FIG. 3, the total detected field $U(r'; t)$ is preprocessed through analog circuitry and buffer memory 52, is converted from analog to digital form by A/D converter 54, and is Fourier transformed in time at 55. The scattered field $\Psi(r'; R_o)$ is then calculated within the Born approximation at 56 according to $$\Psi(r'; R_o) = U(r') - H_o(k|r' - R_o|) \tag{8}$$

where $H_o(x)$ is the zero order Hankel function of the first kind, and where $\Psi(r'; R_o)$ is defined in terms of the scattered field produced by a cylindrical wave source located at $R_o = (x_o, y_o)$. The detector location is denoted as $r'$ which equals $(x', y')$. Again, the scattered field is being characterized by its amplitude rather than its phase. If desired, the Rytov approximation may be used as discussed above. From the scattered field calculated at 56, the cylindrical wave response may be determined at 60 according to the general transform $$\gamma(s;R_o) = \int_{\Sigma'} dl' \left[ in' \cdot ks \psi(r';R_o) + \frac{\partial}{\partial n'} \psi(r';R_o) \right] e^{-iks \cdot r'} \tag{9}$$

Transform (9), like transform (2), may be seen to correlate with the Fourier transforms used directly before the filtered backpropagation techniques of copending Ser. Nos. 441,323 and 533,391. The Fourier transform is not utilized, however, due to the fact that it is not appropriate over a general surface.

From the cylindrical wave response derived at 60, the plane wave scattering amplitude used as input into the filtered backpropagation technique disclosed above may be determined by an artificial slant stack of the cylindrical wave response at 62 according to $$\gamma(s;s_o) = \frac{i}{4} \int_{\Sigma_o} dl_o \left[ iR_o \cdot ks_o \gamma(s;R_o) - \frac{\partial}{\partial R_o} \gamma(s;R_o) \right] e^{iks_o \cdot R_o} \tag{10}$$

where $dl_o$ is the differential length on surface 15, $R_o$ is the location of the cylindrical or spherical wave source, $\hat{R}_o$ is the unit outward normal to surface 15, and $$\frac{\partial}{\partial R_o}$$

is the derivative along the $\hat{R}_o$ direction. The derived plane wave scattered amplitude response may then be input into the filtered backpropagation technique utilized for plane wave sources on general surfaces to provide a partial reconstruction of the object. If a full reconstruction is desired, the output must be summed over view angles.

As with the plane wave embodiment, the cylindrical wave response mathematically simplifies for separable boundaries within the Helmholtz equation. Thus for infinite straight line measurement boundaries $$\gamma(s;R_o) = 2ikn' \cdot s \int_{-\infty}^{\infty} dl' \psi(l';R_o) e^{iks \cdot r'} \tag{11}$$

and for circular boundaries $$\gamma(s;R_o) = 4i \int_0^{2\pi} d\sigma \psi(\sigma;R_o) F_R(\chi - \sigma) \tag{12}$$

where $\sigma$ is the angle made by $r'$ with an arbitrary reference direction, and where $F_R$ is given by equation 5.

For boundaries of weak curvature, the cylindrical wave scattering amplitude is approximated by:

$$\gamma(s,R_o) \approx 2ik \int_{\Sigma'} dl' n' \cdot s \psi(r';R_o) e^{-iks \cdot r'} \tag{13}$$

Thus, it should be appreciated that in these situations, the cylindrical wave response may be determined from the scattered field alone.

The plane wave scattering amplitude artificially derived from the cylindrical wave responses above likewise may be simplified for particular detector geometries. Thus, where surface 15 is a straight line, the plane and cylindrical wave scattering amplitudes are related by:

$$\gamma(s,s_o) = \frac{-k}{2} n_o \cdot s_o \int_{-\infty}^{\infty} dl_o \gamma(s;l_o) e^{iks_o \cdot R_o} \quad (14)$$

for all $s_o$ such than $\hat{n} \cdot s_o \leq 0$ and where $l_o$ denotes the location of $R_o$ on the straight boundary line.

Where surface 15 is a circular boundary centered at the origin, transform 10 simplifies to:

$$\gamma(s,s_o) = \int d\beta \gamma(s;\beta) F_{R_o}(\beta - \chi_o) \quad (15)$$

where $F_{R_o}(x)$ is defined in (5) with R replaced $R_o$, and where $\beta$ and $\chi_o$ are, respectively, the angles formed by $R_o$ and $s_o$ with an arbitrary reference direction.

Finally, for cases where the curvature of the boundary 15 is sufficiently small that it can be approximated by a straight line in the vicinity of each point, transform (10) simplifies to:

$$\gamma(s,s_o) \approx \frac{-k}{2} \int_{\Sigma_o} dl_o n_o \cdot s_o \gamma(s;R_o) e^{iks_o \cdot R_o} \quad (16)$$

In summary, in the case of cylindrical wave sources along an arbitrary surface, an object may be reconstructed by determining the cylindrical wave scattering response, generating the plane wave scattering amplitude from the cylindrical wave response, processing the derived scattering amplitude according to the filtered backpropagation technique of the plane wave arbitrary surface embodiment detailed above, and summing over view angles. In certain well-defined situations where the detection boundaries are appropriately shaped, the cylindrical wave scattering response, and the plane wave scattering amplitude are greatly simplified. Those skilled in the art will recognize that the steps of determining the cylindrical wave scattering response and generating the plane wave scattering amplitude can be combined into a single integral transform relating the cylindrical wave scattering response directly to the scattering amplitude.

Figure 4:
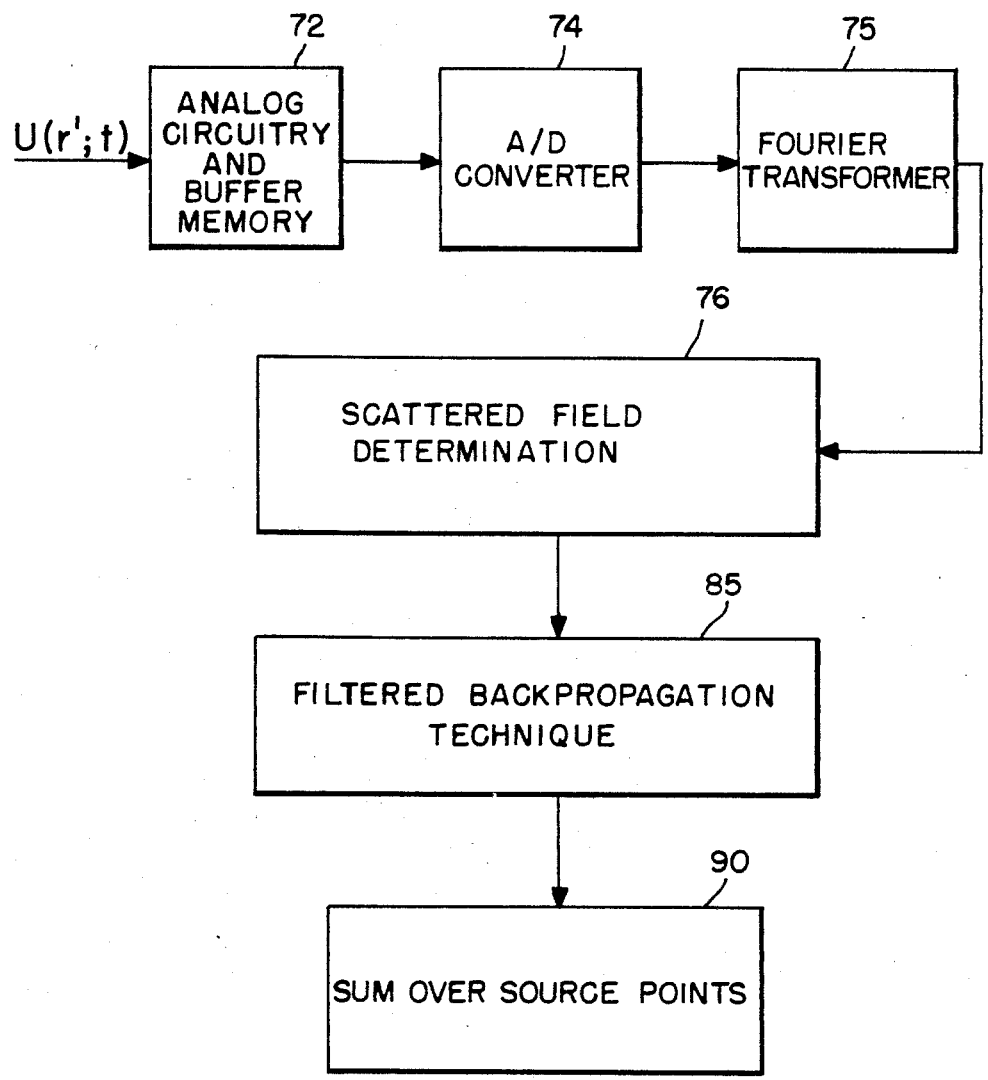
FIG. 4 is a block diagram of the preprocessing and filtered backpropagation technique utilized for the reconstruction of an object directly from the cylindrical wave response according to fan beam diffraction tomography.

As an alternative to determining the plane wave scattering amplitude from the cylindrical wave response and processing with the plane wave arbitrary surface filtered backpropagation technique, a true fan beam filtered backpropagation technique which operates directly on the measured cylindrical wave scattering response is seen in FIG. 4. After the usual preprocessing by an analog circuitry and buffer memory 72, an analog to digital converter 74, and a Fourier transformer 75, the scattered field is calculated at 76 within the Born approximation as in (8) above. If surfaces $\Sigma_o$ and $\Sigma'$ are infinite lines, a partial reconstruction of the object profile may then be determined at 85 according to the filtered backpropagation technique:

$$O(r;l_o) = \int_{-\infty}^{\infty} dl' \psi(l';l_o) G_p(r;l';l_o) \quad (17)$$

where $$G_p(r;l';l_o) = \frac{-ik^4}{2(2\pi)^2} \int_{-\pi}^{\pi} d\chi_o \int_{-\pi}^{\pi} d\chi(n_o \cdot \quad (18)$$

$$s_o)(n' \cdot s) \sqrt{1 - (s \cdot s_o)^2} \, e^{iks \cdot (r-r')} e^{-iks_o \cdot (r-R_o)}$$

In order to obtain a full reconstruction, a sum of the partial reconstructions is performed at 90 by integrating over the source point locations $l_o$. Thus, $$O(r) = \int_{-\infty}^{\infty} dl_o O(r,l_o) \quad (19)$$

Where surfaces 15, and 20 are circles, the filtered backpropagation technique takes the form of:

$$O(r) = \int_{-\pi}^{\pi} d\beta \int_{-\infty}^{\infty} d\sigma \psi(\sigma;\beta) G_c(r;\sigma;\beta) \quad (20)$$

where $$G_c(r;\sigma;\beta) = \frac{2ik^2}{(2\pi)^2} \int_{-\pi}^{\pi} d\chi_o \int_{-\pi}^{\pi} d\chi \sqrt{1 - (s \cdot s_o)^2} \, F_R(\chi - \quad (21)$$

$$\sigma) F_{R_o}(\beta - \chi_o) e^{ik(s-s_o) \cdot r}$$

with $\sigma$ and $\beta$ representing, respectively, the angles formed by $r'$ and $R_o$ with an arbitrary reference direction, and with $F_R$ being defined as in (5) above. Here, R is the radius of the detector boundary 20, and $R_o$ is the radius of the source boundary 15.

Finally, where surfaces 15 and 20 are arbitrary but have weak curvature as described with regard to the plane wave arbitrary surface filtered backpropagation technique, a full reconstruction can be approximated by:

$$O(r) \approx \int_{-\infty}^{\infty} dl_o \int_{-\infty}^{\infty} dl' \psi(r';R_o) G_p(r;r';R_o) \quad (22)$$

where $G_p(r; r', R_o)$ is set equal to (18) above.

Those skilled in the art should understand that the fan beam filtered backpropagation techniques (17), (20), and (22) disclosed above, are derived by substituting the derived scattering amplitude of the cylindrical source embodiments into the inversion formula $$O(r) = \frac{1}{2(2\pi)^2} \int_{-\pi}^{\pi} d\chi_o \int_{-\pi}^{\pi} d\chi \sqrt{1 - (s \cdot s_o)^2} \, \gamma(s;s_o) e^{ik(s-s_o) \cdot r} \quad (23)$$

disclosed by the inventor in Devaney, A. J., A Filtered Backpropagation Algorithm for Diffraction Tomography, *Ultrasonic Imaging* 4, 336-350 (1982), and reorganizing the result. The interesting outcome is that the derived filtered backpropagation techniques operate directly on the measured cylindrical wave scattering response without the step of determining the plane wave scattering amplitude required by the second embodiment herein, and that a full reconstruction is obtained by summing over source points rather than over angles; i.e. a true fan beam tomographic procedure.

While the three embodiments described herein implicitly assume a two-dimensional object whose properties are constant in one direction, those skilled in the art will appreciate that the embodiments are readily extended to three-dimensional objects. Thus, as would be suggested by Ser. No. 441,323, measurement boundary 15 may be replaced by a surface formed by sweeping the boundary 15 along the perpendicular to the plane in which boundary 15 lies. Thus, for example, a circular cylinder would replace a circular boundary while a plane surface would replace a line boundary. The three-dimensional object may then be reconstructed by projecting the scattered field measurements performed along the surface boundary onto the boundary 15 and performing the preprocessing and filtered backpropagation techniques described above for the appropriate situation. The resulting reconstruction will be of a projection of the three-dimensional object profile onto the plane formed by surface 15. Thus, as described in Ser. No. 441,323, in order to obtain a full three-dimensional reconstruction, insonification will have to be repeated with measurement surfaces having different orientations relative to the object, e.g. rotation of the object or of the sources.

Alternatively, three-dimensional reconstructions can be obtained by generalizing the fundamental relationships, transforms, etc., set forth above. For example, the inversion formula (23) may be extended to three dimensions by:

$$O(r) = -\frac{k}{(2\pi)^4} \int d\Omega_{s_o} \int d\Omega_s \, |s - s_o| \, \gamma(s, s_o) e^{ik(s-s_o)\cdot r} \quad (24)$$

where $d\Omega_s$ and $d\Omega_{s_o}$ are differential solid angles and the integrals are over $4\pi$ steradians. By employing (24) together with the appropriate three-dimensional generalization of the expressions for the scattering amplitude, three-dimensional filtered backpropagation techniques analogous to techniques (17), (20), and (22), can be obtained.

There has been described and illustrated herein, methods and systems in accordance with the present invention for reconstructing object profiles according to diffraction tomographic procedures using filtered backpropagation techniques, wherein the sources and detectors of energy may be located along arbitrary surfaces. While particular embodiments of the invention have been described, it is not intended that the invention be limited thereby, as it is intended that the invention be broad in scope and that the specifications be read likewise. Thus, those skilled in the art will recognize that some of the described method steps may be combined, or divided with no resulting change in the outcome. Likewise, those skilled in the art will appreciate that the measurement surface of the system can be changed for each source pulse insonification by redefining the vectors. Again, if properly done, no changes in outcome will result. Further, it should be readily understood that while the specification has disclosed certain simplifying embodiments such as the cases where both the source and detector surfaces are circular or of simple geometry, it is not intended that the invention be limited in its simplifying embodiments. Thus, for example, if the source surface is arbitrary, while the detector surface is circular, certain simplifications will result, and the invention, as claimed, is intended to encompass such embodiments. Therefore, it will be apparent to those skilled in the art that other changes and modifications may be made to the invention as described in the specification without departing from the spirit and scope of the invention as so claimed.

I claim:

1. A method for the tomographic reconstruction of an object which has diffracted waves of energy propagating through it, said waves of energy being selected from a group consisting of sonic and electromagnetic waves, comprising:

obtaining signals which are a function of at least one of the phase and amplitude of the diffracted propagating waves after said waves have interacted with said object, wherein the sources of said energy waves are located along an arbitrary curvilinear surface, other than a single straight line and the detectors of said diffracted waves are located along an arbitrary curvilinear surface other than a single straight line; and converting said signals by means of a filtered backpropagation technique into an array representing a partial reconstruction of the object.

2. A method according to claim 1 further comprising:

preprocessing said obtained signals before said converting step wherein said signals converted by said converting step are preprocessed signals, and wherein said preprocessing includes transforming said obtained signals with a general transform.

3. A method according to claim 2 wherein:

said sources of energy are plane wave sources; and said general transform transforms a determined scattered field into a plane wave scattering amplitude for input into said filtered backpropagation technique.

4. A method according to claim 3 wherein:

said preprocessed signals are filtered according to the filtered backpropagation technique $$\hat{O}(r;\chi_o) = \frac{k^2}{4\pi} \int_{-\pi}^{\pi} d\chi \sqrt{1 - (\underline{s} \cdot \underline{s}_o)^2} \, \gamma(\underline{s};\underline{s}_o) e^{ik(\underline{s}-\underline{s}_o)\cdot\underline{r}}$$

wherein $s_o$ is a unit propagation vector of the incident plane waves, s is a unit vector which may assume all directions, r is the vector from a coordinate system origin to a particular point of reconstruction in said coordinate system, $\gamma(s;s_o)$ is the plane wave scattering amplitude, $\chi$ and $\chi_o$ are respectively the angles formed by s and $s_o$ with a fixed reference direction, and $\hat{O}(r;\chi_o)$ is the partial reconstruction of the object.

5. A method according to claim 4 wherein said object is two-dimensional further comprising:

summing said partial reconstructions over a plurality of view angles to obtain a full two-dimensional reconstruction of said object.

6. A method according to claim 5 wherein:

said detectors are located along a circular boundary.

7. A method according to claim 6 wherein:

said energy sources are located along a circular boundary.

8. A method according to claim 5 wherein:

said detectors are located along a boundary of weak curvature.

9. A method according to claim 5 wherein:

said detectors are located along a boundary which approximates two infinite parallel lines.

10. A method according to claim 4 wherein said preprocessing further comprises:
transforming said obtained signals from analog to digital form;
Fourier transforming said digital signals in time; and
determining the scattered field from said Fourier tansformed signals.

11. A method according to claim 2 wherein:
said sources of energy are cylindrical or spherical wave sources;
said general transform transforms a scattered field into a cylindrical wave response; and
said cylindrcial wave response is slant stacked to provide the plane wave scattering amplitude for input into said filtered backpropagation technique.

12. A method according to claim 11 wherein:
said preprocessed signals are filtered according to the filtered backpropagation technique $$\hat{O}(r;\chi_o) = \frac{k^2}{4\pi} \int_{-\pi}^{\pi} d\chi \sqrt{1 - (s \cdot s_0)^2}\ \gamma(s;s_o) e^{ik(s-s_o)\cdot r}$$

wherein $s_o$ is a unit propagation vector of the incident waves, s is a unit vector which may assume all directions, r is the vector from the origin of a coordinate system to a particular point of reconstruction in said coordinate system, $\gamma(s;s_o)$ is the plane wave scattering amplitude, $\chi$ and $\chi_o$ are respectively the angles formed by s and $s_o$ with a fixed reference direction, and $\hat{O}(r;\chi_o)$ is the partial reconstruction of the object.

13. A method according to claim 12 wherein said object is two-dimensional further comprising:
summing said partial reconstructions over a plurality of view angles to obtain a full two-dimensional reconstruction of said object.

14. A method according to claim 13 wherein said preprocessing further comprises:
transforming said obtained signals from analog to digital form;
Fourier transforming said digital signals in time; and
determining the scattered field from said Fourier tansformed signals.

15. A method according to claim 14 wherein:
said detectors are located along a circular boundary.

16. A method according to claim 15 wherein:
said energy sources are located along a circular boundary.

17. A method according to claim 14 wherein:
said detectors are located along a boundary of weak curvature.

18. A method according to claim 14 wherein:
said detectors are located along a boundary which approximates two infinite parallel lines.

19. A method according to claim 1 further comprising:
preprocessing said obtained signals before said converting step wherein said signals converted by said converting step are preprocessed signals.

20. A method according to claim 19 wherein said sources of energy are cylindrical or spherical wave sources and said proprocessing comprises:
transforming said obtained signals from analog to digital form;
Fourier transforming said digital signals in time; and
determining the scattered field from said Fourier transformed signals.

21. A method according to claim 20 further comprising:
summing said partial reconstructions to obtain a full reconstruction by integrating over the point locations of said sources.

22. A method according to claim 20 wherein:
said object is two-dimensional;
said sources and detectors are located along circular boundaries; and
said scattered field is filtered according to a filtered backpropagation technique $$\hat{O}(r;\beta) = \int_{-\infty}^{\infty} d\sigma \psi(\sigma;\beta) G_c(r;\sigma;\beta)$$

where $$G_c(r;\sigma;\beta) = \frac{2ik^2}{(2\pi)^2} \int_{-\pi}^{\pi} d\chi_0 \int_{-\pi}^{\pi} d\chi \sqrt{1 - (s \cdot s_0)^2}\ F_R(\chi - \sigma) F_{R_0}(\beta - \chi_0) e^{ik(s-s_o)\cdot r}$$

and wherein $\hat{O}(r,\beta)$ is a partial reconstruction of said object, r is the vector from the origin of a coordinate system to a particular point of reconstruction in the coordinate system, $\beta$ is the angle formed by $R_o$ with an arbitrary reference where $R_o$ is the cylindrical or spherical wave source location, $\sigma$ is the angle made by r′ with an arbitrary reference direction where r′ is a detector point location, $\Psi(\sigma,\beta)$ is the scattered field, $\chi$ and $\chi_o$ are respectively the angles formed by s and $s_o$ with fixed reference directions where s is a unit vector which may assume all directions and $s_o$ is a unit propagation vector of the incident waves, and $F_R$ is a function given by $$F_R(x) = \frac{1}{(2\pi)^2} \sum_{n=0}^{\infty} \frac{i^n}{H_n(kR)} e^{inx}$$

where $H_n$ is the n′th order Hankel function of the first kind, and k is the wave numbeer, and R is the radius of the detector boundary and $R_o$ is the radius of the source boundary.

23. A method according to claim 20 wherein:
said object is two-dimensional;
said detectors are located along a boundary which approximates two infinite parallel lines; and
said scattered field is filtered according to a filtered backpropagation technique $$\hat{O}(r,l_o) = \int_{-\infty}^{\infty} dl' \psi(l';l_o) G_p(r;l';l_o)$$

where $$G_p(r;l';l_o) = \frac{-ik^4}{2(2\pi)^2} \int_{-\pi}^{\pi} d\chi_0 \int_{-\pi}^{\pi} d\chi (n_o \cdot s_0)(n_o \cdot s) \sqrt{1 - (s \cdot s_0)^2}\ e^{iks\cdot(r-r')} e^{-iks_o\cdot(r-R_o)}$$

and wherein $\hat{O}(r,l_o)$ is a partial reconstruction of said object, r is the vector from the origin of a coordinate system to a particular point of reconstruction in the coordinate system, $l_o$ is the location of $R_o$ along a straight boundary line where $R_o$ is the cylindrical or spherical wave source location, l' is the location of r' along the detector surface boundary where r' is the detector point location, $\Psi(l';l_o)$ is the scattered field, $\chi$ and $\chi_o$ are respectively the angles formed by s and $s_o$ with fixed reference directions where s is a unit vector which may assume all directions and $s_o$ is a unit propagation vector of the incident waves, $\hat{n}'$ is the unit outward normal vector to the detecting surface, and $\hat{n}_o$ is the unit outward normal vector to the source surface.

24. A method according to claim 20 wherein:
said object is two-dimensional;
said detectors are located along a boundary of weak curvature; and
said scattered field is filtered according to a filtered backpropagation technique $$\hat{O}(r;l_o) = \int_{-\infty}^{\infty} dl'\psi(r';R_o)G_p(r;r';R_o)$$

where $$G_p(r;r';R_o) \approx \frac{-ik^4}{2(2\pi)^2} \int_{-\pi}^{\pi} d\chi_o \int_{-\pi}^{\pi} d\chi (n_o \cdot s_o)(n' \cdot s)\sqrt{1-(s \cdot s_o)^2} \, e^{iks \cdot (r-r')}e^{-iks_o \cdot (r-R_o)}$$

and wherein $\hat{O}(r,l_o)$ is a partial reconstruction of said object, r is the vector from the origin of a coordinate system to a particular point in the coordinate system, $l_o$ is the location of $R_o$ along a straight boundary line where $R_o$ is the cylindrical or spherical wave source location, l' is the location of r' along the detector surface boundary where r' is the detector point location, $\Psi(r';R_o)$ is the scattered field, $\chi$ and $\chi_o$ are respectively the angles formed by s and $s_o$ with fixed reference directions where s is a unit vector which may assume all directions and $s_o$ is a unit propagation vector of the incident waves, $\hat{n}'$ is the unit outward normal vector to the detecting surface, and $\hat{n}_o$ is the unit outward normal vector to the source surface.

25. A method for the tomographic reconstruction of an object comprising:
directing, from energy sources located along an arbitrary curvilinear surface, waves of energy toward said object;
detecting as a function of time, with detectors located along an arbitrary curvilinear surface other than a single straight line, the fields produced by said waves;
producing signals which are functions of said detected fields;
preprocessing said produced signals; and
filtering said preprocessed signals according to a filtered backpropagation technique to generate an array representing a partial reconstruction of said object.

26. A method according to claim 25 wherein:
said preprocessed signals are filtered according to the filtered backpropagation technique $$\hat{O}(r;\chi_o) = \frac{k^2}{4\pi} \int_{-\pi}^{\pi} d\chi \sqrt{1-(s \cdot s_o)^2} \, \gamma(s;s_o)e^{ik(s-s_o) \cdot r}$$

wherein $s_o$ is a unit propagation vector of the incident waves, s is a unit vector which may assume all directions, r is the vector from the origin of a coordinate system to a particular point of reconstruction in said coordinate system, $\gamma(s;s_o)$ is the plane wave scattering amplitude, $\chi$ and $\chi_o$ are respectively the angles formed by s and $s_o$ with a fixed reference direction, and $\hat{O}(r;\chi_o)$ is the partial reconstruction of the object.

27. A method according to claim 26 wherein said object is a two-dimensional object, further comprising:
summing said partial reconstructions over a plurality of view angles to obtain a full two-dimensional reconstruction of said object.

28. A method according to claim 26 wherein said sources of energy are plane wave sources, and said preprocessing step comprises:
transforming said produced signals from analog to digital form;
Fourier transforming said digital signals in time;
determining the scattered field from said Fourier transformed signals; and
determining the plane wave scattering amplitude by transforming said scattered field with a general transform.

29. A method according to claim 28 wherein:
said detectors and sources are located along circular boundaries.

30. A method according to claim 28 wherein:
said detectors and sources are located along boundaries of weak curvature.

31. A method according to claim 28 wherein:
said detectors and sources are located along boundaries which approximate two infinite parallel lines.

32. A method according to claim 26 wherein said sources of energy are cylindrical or spherical wave sources and said preprocessing step comprises:
transforming said produced signals from analog to digital form;
Fourier transforming said digital signals in time;
determining the scattered field from said Fourier transformed signals;
transforming the scattered field into a cylindrical wave response according to a general transform; and
determining the plane wave scattering amplitude by slant stacking said cylindrical wave response.

33. A method according to claim 32 wherein:
said detectors and sources are located along circular boundaries.

34. A method according to claim 32 wherein:
said detectors and sources are located along boundaries of weak curvature.

35. A method according to claim 32 wherein
said detectors and sources are located along boundaries which approximate two infinite parallel lines.

36. A method according to claim 25 wherein said sources of energy are cylindrical or spherical wave sources and said preprocessing comprises:
transforming said produced signals from analog to digital form;
Fourier transforming said digital signals in time; and
determining the scattered field from said Fourier transformed signals.

37. A method according to claim 36 further comprising:
summing said partial reconstructions by integrating over the point locations of said sources of energy to obtain a full reconstruction of said object.

38. A method according to claim 36 wherein:

said sources and detectors are located along circular boundaries; and said scattered field is filtered according to the filtered backpropagation technique $$O(r;\beta) = \int_{-\infty}^{\infty} d\sigma \psi(\sigma;\beta) G_c(r;\sigma;\beta)$$

where $$G_c(r;\sigma;\beta) = \frac{2ik^2}{(2\pi)^2} \int_{-\pi}^{\pi} d\chi_o \int_{-\pi}^{\pi} d\chi \sqrt{1-(s\cdot s_o)^2} \, F_R(\chi - \sigma) F_{R_o}(\beta - \chi_o) e^{ik(s-s_o)\cdot r}$$

and wherein $\hat{O}(r,\beta)$ is a partial reconstruction of said object, r is the vector from the origin of a coordinate system to a particular point located in said coordinate system, $\beta$ is the angle formed by $R_o$ with an arbitrary reference where $R_o$ is the cylindrical or spherical wave source location, $\sigma$ is the angle made by r' with arbitrary reference direction where r' is a detector point location, $\Psi(\sigma,\beta)$ is the scattered field, $\chi$ and $\chi_o$ are respectively the angles formed by s and $s_o$ with fixed reference directions where s is a unit vector which may assume all directions and $s_o$ is a unit propagation vector of the incident waves, and $F_R$ is a function given by $$F_R(x) = \frac{1}{(2\pi)^2} \sum_{n=0}^{\infty} \frac{i^n}{H_n(kR)} e^{inx}$$

where $H_n$ is the n'th order Hankel function of the first kind, and k is the wavenumber, and R is the radius of the detector boundary and R is the radius of the source boundary.

39. A method according to claim 36 wherein:
said detectors are located along a boundary which approximates two infinite parallel lines; and said scattered field is filtered according to the filtered backpropagation technique $$O(r,l_o) = \int_{-\infty}^{\infty} dl' \psi(l';l_o) G_p(r;l';l_o)$$

where $$G_p(r;l';l_o) = \frac{-ik^4}{2(2\pi)^2} \int_{-\pi}^{\pi} d\chi_o \int_{-\pi}^{\pi} d\chi(n_o \cdot s_o)(n_o \cdot s)\sqrt{1-(s\cdot s_o)^2} \, e^{iks\cdot(r-r')} e^{-iks_o\cdot(r-R_o)}$$

and wherein $\hat{O}(r,l_o)$ is a partial reconstruction of said object, r is the vector from the origin of a coordinate system to a particular point in the coordinate system, $l_o$ is the location of $R_o$ along a straight boundary line where $R_o$ is the cylindrical or spherical wave source location, l' is the location of r' along the detector surface boundary where r' is the detector point location, $\Psi(l_o;l')$ is the scattered field, $\chi$ and $\chi_o$ are respectively the angles formed by s and $s_o$ with fixed reference directions where s is a unit vector which may assume all directions and $s_o$ is a unit propagation vector of the incident waves, $\hat{n}'$ is the unit outward normal vector to the detecting surface, and $\hat{n}_o$ is the unit outward normal vector to the source surface.

40. A method according to claim 36 wherein:
said detectors are located along a boundary of weak curvature; and said scattered field is filtered according to a filtered backpropagation technique $$O(r;l_o) = \int_{-\infty}^{\infty} dl' \psi(r';R_o) G_p(r;r';R_o)$$

where $$G_p(r;r';R_o) \simeq \frac{-ik^4}{2(2\pi)^2} \int_{-\pi}^{\pi} d\chi_o \int_{-\pi}^{\pi} d\chi(n_o \cdot s_o)(n' \cdot s)\sqrt{1-(s\cdot s_o)^2} \, e^{iks\cdot(r-r')} e^{-iks_o\cdot(r-R_o)}$$

and wherein $\hat{O}(r,l_o)$ is a partial reconstruction of said object, r is the vector from the origin of a coordinate system to a particular point in said coordinate system, $l_o$ is the location of $R_o$ along a straight boundary line where $R_o$ is the cylindrical or spherical wave source location, l' is the location of r' along the detector surface boundary where r' is the detector point location, $\Psi(r';R_o)$ is the scattered field, $\chi$ and $\chi_o$ are respectively the angles formed by s and $s_o$ with fixed reference directions where s is a unit vector which may assume all directions and $s_o$ is a unit propagation vector of the incident waves, $\hat{n}'$ is the unit outward normal vector to the detecting surface, and $\hat{n}_o$ is the unit outward normal vector to the source surface.

41. A system for the tomographic reconstruction of an object comprising:
energy sources located along an arbitrary curvilinear surface for insonifying said object with waves of energy;

detectors of energy located along an arbitrary curvilinear surface other than a single straight line, for detecting the fields produced by the interaction of said source energy with said object and for producing signals which are functions of said detected fields;

preprocessing means for preprocessing said produced signals; and processing means for filtering and backpropagating said preprocessed signals according to a filtered backpropagation technique to generate an array representing a partial reconstruction of said object.

42. A system according to claim 41 wherein:
said processing means includes means for filtering and backpropagating said preprocessed signals according to the filtered backpropagation technique $$O(r;\chi_o) = \frac{k^2}{4\pi} \int_{-\pi}^{\pi} d\chi \sqrt{1-(s\cdot s_o)^2} \, \gamma(s;s_o) e^{ik(s-s_o)\cdot r}$$

wherein $s_o$ is a unit propagation vector of the incident waves, s is a unit vector which may assume all directions, r is the vector from the origin of a coordinate system to a particular point of reconstruction in said coordinate system, $\gamma(s;s_o)$ is the plane wave scattering amplitude, $\chi$ and $\chi_o$ are respectively the angles formed by s and $s_o$ with a fixed reference direction, and $\hat{O}(r;\chi_o)$ is the partial reconstruction of the object.

* * * * *

UNITED STATES PATENT AND TRADEMARK OFFICE
CERTIFICATE OF CORRECTION

PATENT NO. : 4,598,366
DATED : July 1, 1986
INVENTOR(S) : Anthony J. Devaney

It is certified that error appears in the above-identified patent and that said Letters Patent is hereby corrected as shown below:

Column 1, line 52, "as" should read -- an --.

Column 12, line 16, delete "other than a single straight line".

Signed and Sealed this

Twenty-eighth Day of October, 1986

[SEAL]

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,598,366

DATED : July 1, 1986

INVENTOR(S) : Anthony J. Devaney

It is certified that error appears in the above-identified patent and that said Letters Patent is hereby corrected as shown below:

Columns 1 - 18, should be deleted to be replaced with columns 1 - 18, as shown on the attached sheets.

Signed and Sealed this

Seventeenth Day of February, 1987

Attest:

DONALD J. QUIGG

Attesting Officer      Commissioner of Patents and Trademarks ative application Ser. No. 441,323, now U.S. Pat. No. 4,562,540, entitled "Diffraction Tomography Systems and Methods" filed on Nov. 12, 1982 and of copending application Ser. No. 533,391 entitled "Diffraction Tomography Systems and Methods with Fixed Detector Arrays" filed on Sept. 19, 1983. The entire texts of both Ser. Nos. 441,323, now U.S. Pat. No. 4,562,540, and 533,391 are hereby incorporated by reference herein.

DIFFRACTION TOMOGRAPHY SYSTEMS AND METHODS WITH ARBITRARY SOURCE AND DETECTOR ARRAY SURFACES

A continuation-in-part of copending application Ser. No. 441,323, now U.S. Pat. No. 4,562,540, entitled "Diffraction Tomography Systems and Methods" filed on Nov. 12, 1982 and of copending application Ser. No. 533,391 entitled "Diffraction Tomography Systems and Methods with Fixed Detector Arrays" filed on Sept. 19, 1983. The entire texts of both Ser. Nos. 441,323, now U.S. Pat. No. 4,562,540, and 533,391 are hereby incorporated by reference herein.

BACKGROUND

This invention relates to systems and methods for reconstructing acoustic and/or electromagnetic properties of objects with diffraction tomographic procedures using filtered backpropagation techniques wherein the sources of acoustic and/or electromagnetic energy may be located on any arbitrary surface totally or partially surrounding the object, and the detectors of such energy likewise may be located on any arbitrary surface totally or partially surrounding the object.

For purposes of this application and the claims herein, it should be understood that the waves of energy which propagate and diffract according to the invention include but are not limited to sonic or electromagnetic waves. The term "sonic wave" shall be interpreted as broadly as possible and shall be understood to include all elastic wave phenomena in liquid and solid materials including, but not limited to, acoustic, compressional, shear, and elastic waves. The term "acoustic wave" shall be interpreted herein to be the equivalent of "sonic wave". The term "electromagnetic wave" shall be interpreted in its broadest sense and shall include, but not be limited to infrared rays, X-rays, and the class known as "optics".

Further, for purposes of this application, the term "arbitrary surface" shall be understood in its broad sense and shall include all surfaces as well as the term "boundary".

More particularly, this invention relates to diffraction tomographic procedures using filtered backpropagation techniques where the plane wave or fan beam (cylindrical or spherical wave) sources and the detectors are located on arbitrary surfaces, and the object of reconstruction may be either a two or three dimensional body.

In the special cases where the detector surface used in the invention is an infinite plane on one side of the object, the methods reduce to the fixed detector plane invention disclosed in copending Ser. No. 533,391. If the single detector plane is allowed to rotate so as to remain perpendicular to the source of energy, the method reduces to the classical ultrasound diffraction tomographic technique described in copending Ser. No. 441,323.

As disclosed in Ser. No. 441,323, computer-aided diffraction tomography which attempts to account for the diffraction of acoustic energy as it propagates through a body of interest has been known in the art. While the proposed solutions prior to Ser. No. 441,323 were inadequate as regards reconstruction accuracy or practicality, the backpropagation filter and filtered backpropagation technique disclosed in Ser. No. 441,323, permitted the tomographic reconstruction of an investigated object with a practical accurate system and method which properly accounted for the diffraction of acoustic and/or electromagnetic waves propagating through an object. The detailed disclosure in Ser. No. 441,323 described ultrasound embodiments with coplanar sources and detectors which simultaneously rotated around the object, and provided the basis for the use of backpropagation filters and filtered backpropagation techniques in the diffraction tomography arts. The Background section of Ser. No. 441,323 also provided some of the theoretical foundations of filtered backpropagation.

Copending Ser. No. 533,391 expanded upon Ser. No. 441,323 to provide optimal reconstructions where the detector array was fixed in space such that the sources and detectors were non-coplanar, and discussed slant stack procedures for generating insonifying plane waves having various angles of insonfication from a fixed cylindrical wave source array. Also, among other things, Ser. No. 533,391 provided a method for the direct three-dimensional reconstruction of an object.

While Ser. Nos. 441,323 and 533,391 provided the groundwork for making the field of ultrasound diffraction tomography viable, the systems and methods discussed therein described particular geometries. Others working with filtered backpropagation in the acoustic tomography arts such as M. F. Adams and A. P. Anderson; "Synthetic Aperture Tomographic Imaging for Microwave Diagnostics", IEE: (England, April, 1982), have disclosed nothing more than the simplest geometry of Ser. No. 441,323 which is not always practicable or desirable.

SUMMARY

It is therefore an object of this invention to provide methods and systems for the tomographic reconstruction of objects using filtered backpropagation techniques wherein the source energy is generated from sources over an arbitrary surface and the detectors of such energy are located on an arbitrary surface.

It is another object of this invention to provide methods and systems for the tomographic reconstruction of two and three dimensional objects using filtered backpropagation techniques wherein the sources of energy approximate plane waves and are located on an arbitrary curvilinear surface, and the detectors are located on an arbitrary curvilinear surface.

It is yet another object of this invention to provide methods and systems for the tomographic reconstruction of two or three dimensional objects using filtered backpropagation techniques wherein the source of energy are either spherical or cylindrical waves and the sources and detectors are located on arbitrary curvilinear surfaces.

Yet another object of this invention is to provide methods and systems for the tomographic reconstruction of objects using filtered backpropagation techniques wherein the fan beam sources and the detectors are located in circular or spherical boundary geometries.

In accordance with the objects of the invention, the diffraction tomographic methods and systems disclosed herein provide increased capabilities as compared to Ser. Nos. 441,323 and 533,391, as the sources and detectors are permitted to be located along arbitrary surfaces. Preprocessing and filtered backpropagation techniques required for optimal object reconstructions are accordingly provided. In a first embodiment, the insonifying sources are plane wave sources or the equivalent thereof. After the plane waves have interacted with the investigated object, the scattered fields detected along the arbitrary detecting surface are preprocessed with a general transform and then processed according to a filtered backpropagation technique to provide a partial reconstruction of the object. By summing over view angles, a full reconstruction is obtained.

The filtered backpropagation technique utilized according to this invention differs in form from those utilized in copending parent applications Ser. Nos. 441,323, and 533,391 in that, in general, it does not comprise a convolution of filters. However, according to the invention, if one desires to use the identical backpropagation filters and filtered backpropagation techniques of the parent applications, the preprocessing required may be changed such that a unit vector $\underline{s}$ utilized in the general transform and the filtered backpropagation technique is chosen to be limited in the directions it can assume.

In a second embodiment, the sources located on an arbitrary surface are spherical or cylindrical (fan beam) wave sources or approximations thereto. In this embodiment, the scattered field amplitude responses detected by the detectors on an arbitrary surface are preprocessed by slant stacking the detected signals to provide a plane wave response which may then be processed according to the filtered backpropagation technique of the first set of embodiments summarized above. The partial reconstructions so obtained are then summed over view angles to provide a full reconstruction. Thus, the second embodiment can be seen as a quasi-fan beam embodiment, as the sources are of a fan beam nature, but the preprocessing and filtered backpropagation technique are that of the plane wave embodiment.

As an alternative to preprocessing by slant stacking and using the filtered backpropagation technique of the plane wave embodiments, a single operation is provided which is the diffraction tomographic equivalent to the fan beam filtered backprojection algorithm of X-ray tomography. Thus, a third embodiment ("true fan beam") includes a filtered backpropagation technique which operates directly on the obtained spherical or cylindrical wave scattered field data to provide a partial reconstruction of the object. A full reconstruction is provided by summing over source points rather than view angle. Thus, in this fan beam embodiment, rather than constructing a plane wave response and using the filtered backpropagation technique of the embodiments summarized above, each source is treated separately and the data received by all the detectors due to that one source is processed to provide a partial reconstruction. A full reconstruction of the object is obtained by adding the reconstructions, i.e. by summing over all source points.

While the embodiments summarized above and described hereinafter in the Detailed Description apply to two-dimensional objects, the techniques described are readily extended to three dimensions by techniques utilized in aforementioned copending Ser. Nos. 441,323 and 533,391. Thus, as in Ser. No. 441,323, the scattered field measurements performed along a two-dimensional surface may be projected onto a boundary surface and then processed to provide a three-dimensional reconstruction. If such a technique is used, a sequence of experiments employing measurement surfaces having different orientations relative to the body under investigation is required for full three-dimensional reconstructions. Alternatively, the theories, algorithms, and techniques used in the invention may be readily extended to their three-dimensional equivalents.

BRIEF DESCRIPTION OF THE DRAWINGS

FIG. 1 illustrates the geometry of diffraction tomography with arbitrary sources and receiver surfaces.

FIG. 2 is a block diagram of the preprocessing and filtered backpropagation technique performed on detected signals for the reconstruction of the object when the arbitrary source surface contains plane wave sources.

FIG. 3 is a block diagram for the additional preprocessing performed when the arbitrary source surface contains cylindrical wave sources.

FIG. 4 is a block diagram of the preprocessing and filtered backpropagation technique utilized for the reconstruction of an object directly from the cylindrical wave response according to fan beam diffraction tomography.

DETAILED DESCRIPTION OF THE PREFERRED EMBODIMENT

PLANE WAVE ARBITRARY SURFACE DIFFRACTION TOMOGRAPHY

Turning to FIG. 1, the geometries of diffraction tomography with arbitrary source and receiver surfaces may be seen. The object 10 is ideally embedded in a homogeneous isotropic medium and is surrounded by an arbitrary curvilinear source surface $\Sigma_o$ indicated on FIG. 1 as 15, and an arbitrary curvilinear receiver surface $\Sigma'$ indicated as 20. $\underline{R}_o$ is the vector from the coordinate system origin, preferably chosen to be near the "center" of object 10, to a particular source on surface 15, while $\underline{r}'$ is the vector from the coordinate system origin to a particular detector on surface 20. The outward unit vector normal to $\Sigma'$ is represented by $\underline{\hat{n}}'$, while dl' is a differential length on surface 20. The vector $\underline{s}_o$ is the unit propagation vector of the plane wave originating from the sources on surface 15, while $\underline{s}$ is a unit vector which can assume all directions. As will be explained hereinafter, the choice of vector s may be very important, as the filtered backpropagation technique utilized in reconstructing the object 10 can be simplified to be identical to those filtered backpropagation techniques used in copending Ser. Nos. 441,323 and 533,391 if $\underline{s}$ is chosen properly.

If the sources of electromagnetic or sonic energy located along surface 15 are plane wave sources or approximations thereto, the block diagram of FIG. 2 represents the best mode preprocessing and filtered backpropagation technique for reconstructing the properties of object 10. When an incident plane wave, exp-$(ik\underline{s}_o \cdot \underline{r})$, from a source located along surface 15 interacts with object 10, the resulting fields are detected by detectors located along surface 20. The total detected field $U(\underline{r}'; t)$ is preprocessed through conventional analog circuitry and buffer memory 22, and is then converted from analog to digital form by A/D converter 24. After the digital signals are Fourier transformed in time at 25, the scattered field $\Psi(\underline{r}'; \underline{s}_o)$ is then calculated within the Born approximation at 26 according to $$\Psi(\underline{r}'; \underline{s}_o) = [U(\underline{r}') - U_o(\omega)e^{ik\underline{s}_o \cdot \underline{r}'}] \tag{1}$$

where $U(\underline{r}')$ is the total field, $k$ is the wavenumber at frequency $\omega$, and $U_o(\omega)e^{ik\underline{s}_o\cdot\underline{r}'}$ is the insonifying plane wave at measurement point $\underline{r}'$ and at frequency $\omega$. Within the Born approximation, the scattered field is characterized by its amplitude. Of course, if desired, the scattered field can be derived within the Rytov approximation such that the scattered field is characterized by its phase. Thus, the amplitude of the scattered field would be replaced with the Rytov phase according to methods and equations disclosed in copending application Ser. Nos. 441,323 and 533,391. As discussed in those applications, if the Rytov approximation is used, complex phase converting and phase unwrapping are necessary.

Returning to FIG. 1, the plane wave scattering amplitude, $\gamma(\underline{s}; \underline{s}_o)$, is derived at 30 from the determined scattered field according to the general transform $$\gamma(\underline{s},\underline{s}_o) = \int_{\Sigma'} d\Gamma \left[\hat{n}' \cdot k\underline{s}\psi(\underline{r};\underline{s}_o) - \frac{\partial}{\partial n'}\psi(\underline{r};\underline{s}_o)\right] e^{-ik\underline{s}\cdot\underline{r}} \quad (2)$$

where $\hat{n}'$ is the unit outward normal vector to surface $\Sigma'$ at point $\underline{r}'$, and $$\frac{\partial}{\partial n'}$$

denotes the derivative along the $\hat{n}'$ direction. Transform (2) is used instead of the Fourier transforms used directly before the filtered backpropagation techniques in copending Ser. Nos. 441,323 and 533,391 because Fourier transforms are not appropriate transforms for general curvilinear surfaces.

Because in most applications it is difficult to measure both $\Psi(\underline{r}'; \underline{s}_o)$ and $$\frac{\partial}{\partial n'}\psi(\underline{r};\underline{s}_o),$$

it is important to note that transform (2) may be simplified in certain circumstances. Thus, it is possible to obtain an exact relationship between the plane wave scattering amplitude $\gamma(\underline{s}; \underline{s}_o)$ and either $\Psi(\underline{r}'; \underline{s}_o)$ or $$\frac{\partial}{\partial n'}\psi(\underline{r};\underline{s}_o)$$

when the detection boundaries coincide with one of the coordinate axes of a curvilinear coordinate system in which the Helmholtz equation separates. Important examples of such boundaries are circles and infinite straight lines. For an infinite straight line, when $\hat{n}'\cdot\underline{s}\geq 0$, the integrals involving $\Psi(\underline{r}'; \underline{s}_o)$ and $$\frac{\partial}{\partial n'}\psi(\underline{r};\underline{s}_o)$$

are equal and thus transform (2) simplifies to $$\gamma(\underline{s};\underline{s}_o) = 2ik\hat{n}'\cdot\underline{s}\int_{-\infty}^{\infty} d\Gamma\psi(1';\underline{s}_o)e^{-ik\underline{s}_o\cdot\underline{r}} \quad (3)$$

where $\Psi(1', \underline{s}_o)$ denotes the scattered field evaluated on the measurement line. When $\hat{n}'\cdot\underline{s}<0$, the integral involving $\Psi(\underline{r}'; \underline{s}_o)$ exactly cancels the integral involving $$\frac{\partial}{\partial n'}\psi(\underline{r};\underline{s}_o).$$

For the case of a circular boundary, transform 2 reduces to $$\gamma(\underline{s},\underline{s}_o) = 4i\int_0^{2\pi} d\sigma u(\sigma;\underline{s}_o)F_R(\chi - \sigma) \quad (4)$$

where $R$ is the radius of the measurement circle $\Sigma'$ assumed to be centered at the origin, and $\sigma$ and $\chi$ are, respectively, the angles made by $\underline{r}'$ and $\underline{s}$ with an arbitrary reference direction. $\psi(\sigma; \underline{s}_o)$ denotes the scattered field at the angle $\sigma$ and the function $F_R(x)$ is given by $$F_R(x) = \frac{1}{(2\pi)^2}\sum_{n=0}^{\infty} \frac{i^n}{H_n(kR)} e^{inx} \quad (5)$$

where $H_n$ is the n'th order Hankel function of the first kind. It should be noted that the center and radius of $\Sigma'$ can be changed as a function of the insonifying wave vector $\underline{s}_o$, such that a sequence of measurement boundaries, up to one for each value of $\underline{s}_o$, may be employed.

If an arbitrary detection boundary has a weak curvature such that it can be approximated by a straight line in the vicinity of each point (i.e. the local radius of curvature is much larger than a wavelength), an approximate expression for $\gamma(\underline{s}, \underline{s}_o)$ may be employed. In this weak curvature case, transform 2 reduces as:

$$\gamma(\underline{s},\underline{s}_o) = 2ik\int_{\Sigma'} d\Gamma\hat{n}'\cdot\underline{s}\psi(\underline{r};\underline{s}_o)e^{-ik\underline{s}_o\cdot\underline{r}} \quad (6)$$

The scattering amplitude $\gamma(\underline{s}, \underline{s}_o)$ of an acoustic object may be defined and shown to be proportional to the spatial Fourier transform of the object profile evaluated on circles in Fourier space which are the two-dimensional analogues of the well known Ewald spheres of X-ray crystallography. The scattering amplitude should therefore be recognized as the key input into the filtered backpropagation technique, as within the Born approximation the plane wave scattering amplitude is related to the two-dimensional Fourier transform of the object profile via the generalized projection slice theorem. Thus, since similar considerations apply within the Rytov approximation, an estimate of the object profile may be reconstructed from the plane wave response as discussed in copending Ser. No. 441,323.

In order to obtain a partial reconstruction, $\hat{O}(\underline{r}; \chi_o)$, of the object 10, the plane wave scattering amplitude is filtered and backpropagated according to the filtered backpropagation technique:

$$\hat{O}(\underline{r},\chi_o) = \frac{k^2}{4\pi}\int_{-\pi}^{\pi} d\chi\sqrt{1-(\underline{s}\cdot\underline{s}_o)^2}\,\gamma(\underline{s},\underline{s}_o)e^{ik(\underline{s}-\underline{s}_o)\cdot\underline{r}} \quad (7)$$

where $\chi_o$ and $\chi$ are respectively the angles formed by $\underline{s}_o$ and $\underline{s}$ with a fixed reference direction. The filtered backpropagation technique for plane wave illumination with an arbitrary receiver surface does not generally separate out into its usual implementation as a convolution of a backpropagation filter and a deblurring filter (as discussed and claimed in copending Ser. Nos. 441,323 and 533,391). Nevertheless, the process (7) disclosed above is a filtered backpropagation technique for diffraction tomography as it takes the complex amplitude of the wave and filters and backpropagates it into the object space in order to partially reconstruct an object. Of course, the same filtered backpropagation technique applies to a method utilizing the Rytov approximation if the scattered field is expressed in terms of the phase of the total field as previously discussed.

In the special case when the receiver surface 15 comprises two infinite parallel planes on either side of the object, then the filtered backpropagation technique separates into a convolution of a deblurring and backpropagation filters. If only one of the two infinite planes is utilized, the filtered backpropagation technique reduces to the fixed detector plane filtered backpropagation technique disclosed in Ser. No. 533,391. If the single detector plane is allowed to rotate, always remaining perpendicular to unit propagation vector $\underline{s}_0$, then the technique reduces to the basic ultrasound diffraction tomographic technique described in Ser. No. 441,323. Alternatively, by choosing unit vector $\underline{s}$ appropriately, the plane wave response $\gamma(\underline{s}; \underline{s}_0)$ will be put into such a form such that the filtered backpropagation techniques of Ser. Nos. 441,323 and 533,391 may be identically utilized. Thus, it will be seen that if it is desirable to use the filtered backpropagation technique of Ser. No. 441,323, $\chi$ may be allowed to go from $\chi_0 - \pi/2$ to $\chi_0 + \pi/2$. If the backpropagation technique of the fixed detector array diffraction tomography disclosure is desirable, angle $\chi$ may go from $-\pi/2$ to $\pi/2$.

Following processing according to any of the filtered backpropagation techniques, a full two-dimensional reconstruction may be obtained by summing the partial reconstructions over all angles such that $$\hat{O}(\underline{r}) = \frac{1}{2\pi} \int_{-\pi}^{\pi} d\chi_0 \hat{O}(\underline{r};\chi_0) \tag{7a}$$

as seen at 40 of FIG. 2. If $\chi_0$ is chosen as to be permitted to go from $-\pi/2$ to $\pi/2$ as may be seen from FIG. 3 of copending Ser. No. 533,391 (Note that the z axis therein is equivalent to the x axis herein), the integral over $\chi_0$ in (7a) is limited. Likewise, if $\chi$ is chosen to go from $\chi_0 - \pi/2$ to $\chi_0 + \pi/2$, as in copending Ser. No. 431,323, the summation over $\chi$ in filtered backpropagation technique (7) is also limited.

FAN BEAM ARBITRARY SURFACE DIFFRACTION TOMOGRAPHY

If the sources along transmitter surface 15 generate cylindrical or spherical waves rather than plane waves, the preprocessing disclosed above may be altered to permit proper reconstruction. Thus, as seen in FIG. 3, the total detected field $U(\underline{r}'; t)$ is preprocessed through analog circuitry and buffer memory 52, is converted from analog to digital form by A/D converter 54, and is Fourier transformed in time at 55. The scattered field $\Psi(\underline{r}'; \underline{R}_o)$ is then calculated within the Born approximation at 56 according to $$\Psi(\underline{r}'; \underline{R}_o) = U(\underline{r}') - H_0(k|\underline{r}' - \underline{R}_o|) \tag{8}$$

where $H_0(x)$ is the zero order Hankel function of the first kind, and where $\Psi(\underline{r}'; \underline{R}_o)$ is defined in terms of the scattered field produced by a cylindrical wave source located at $\underline{R}_o = (x_o, y_o)$. The detector location is denoted as $\underline{r}'$ which equals $(x', y')$. Again, the scattered field is being characterized by its amplitude rather than its phase. If desired, the Rytov approximation may be used as discussed above. From the scattered field calculated at 56, the cylindrical wave response may be determined at 60 according to the general transform $$\gamma(\underline{s};\underline{R}_o) = \int_{\Sigma} d\underline{r}' \left[ i\hat{n} \cdot k\underline{s}\psi(\underline{r}';\underline{R}_o) - \frac{\partial}{\partial n} \psi(\underline{r}';\underline{R}_o) \right] e^{-ik\underline{s}\cdot\underline{r}'} \tag{9}$$

Transform (9), like transform (2), may be seen to correlate with the Fourier transforms used directly before the filtered backpropagation techniques of copending Ser. Nos. 441,323 and 533,391. The Fourier transform is not utilized, however, due to the fact that it is not appropriate over a general surface.

From the cylindrical wave response derived at 60, the plane wave scattering amplitude used as input into the filtered backpropagation technique disclosed above may be determined by an artificial slant stack of the cylindrical wave response at 62 according to $$\gamma(\underline{s};\underline{s}_0) = \frac{i}{4} \int_{\Sigma_o} dl_o \left[ i\hat{R}_o \cdot k\underline{s}_o\gamma(\underline{s};\underline{R}_o) - \frac{\partial}{\partial R_o} \gamma(\underline{s};\underline{R}_o) \right] e^{ik\underline{s}_o\cdot\underline{R}_o} \tag{10}$$

where $dl_o$ is the differential length on surface 15, $\underline{R}_o$ is the location of the cylindrical or spherical wave source, $\hat{R}_o$ is the unit outward normal to surface 15, and $$\frac{\partial}{\partial R_o}$$

is the derivative along the $\hat{R}_o$ direction. The derived plane wave scattered amplitude response may then be input into the filtered backpropagation technique utilized for plane wave sources on general surfaces to provide a partial reconstruction of the object. If a full reconstruction is desired, the output must be summed over view angles.

As with the plane wave embodiment, the cylindrical wave response mathematically simplifies for separable boundaries within the Helmholtz equation. Thus for infinite straight line measurement boundaries $$\gamma(\underline{s};\underline{R}_o) = 2ik\hat{n} \cdot \underline{s} \int_{-\infty}^{\infty} d\underline{r}'\psi(\underline{r}';\underline{R}_o)e^{ik\underline{s}\cdot\underline{r}'} \tag{11}$$

and for circular boundaries $$\gamma(\underline{s};\underline{R}_o) = 4i \int_0^{2\pi} d\sigma \psi(\sigma;\underline{R}_o)F_R(\chi - \sigma) \tag{12}$$

where $\sigma$ is the angle made by $\underline{r}'$ with an arbitrary reference direction, and where $F_R$ is given by equation 5.

For boundaries of weak curvature, the cylindrical wave scattering amplitude is approximated by:

$$\gamma(\underline{s};\underline{R}_o) \simeq 2ik \int_\Sigma d\underline{r}' \hat{n} \cdot \underline{s}\psi(\underline{r}';\underline{R}_o)e^{-ik\underline{s}\cdot\underline{r}'} \tag{13}$$

Thus, it should be appreciated that in these situations, the cylindrical wave response may be determined from the scattered field alone.

The plane wave scattering amplitude artificially derived from the cylindrical wave responses above likewise may be simplified for particular detector geometries. Thus, where surface 15 is a straight line, the plane and cylindrical wave scattering amplitudes are related by:

$$\gamma(\underline{s},\underline{s}_0) = \frac{-k}{2} \hat{n}_0 \cdot \underline{s}_0 \int_{-\infty}^{\infty} dl_0 \gamma(\underline{s};l_0) e^{ik\underline{s}_0 \cdot \underline{R}_0} \quad (14)$$

for all $\underline{s}_0$ such than $\hat{n} \cdot \underline{s}_0 \leq 0$ and where $l_0$ denotes the location of $\underline{R}_o$ on the straight boundary line.

Where surface 15 is a circular boundary centered at the origin, transform 10 simplifies to:

$$\gamma(\underline{s},\underline{s}_0) = \int d\beta \gamma(\underline{s};\beta) F_{R_0}(\beta - \chi_0) \quad (15)$$

where $F_{R_0}(x)$ is defined in (5) with R replaced $R_o$, and where $\beta$ and $\chi_0$ are, respectively, the angles formed by $R_o$ and $\underline{s}_0$ with an arbitrary reference direction.

Finally, for cases where the curvature of the boundary 15 is sufficiently small that it can be approximated by a straight line in the vicinity of each point, transform (10) simplifies to:

$$\gamma(\underline{s},\underline{s}_0) = \frac{-k}{2} \int_{\Sigma_o} dl_0 \hat{n}_0 \cdot \underline{s}_0 \gamma(\underline{s};\underline{R}_0) e^{ik\underline{s}_0 \cdot \underline{R}_0} \quad (16)$$

In summary, in the case of cylindrical wave sources along an arbitrary surface, an object may be reconstructed by determining the cylindrical wave scattering response, generating the plane wave scattering amplitude from the cylindrical wave response, processing the derived scattering amplitude according to the filtered backpropagation technique of the plane wave arbitrary surface embodiment detailed above, and summing over view angles. In certain well-defined situations where the detection boundaries are appropriately shaped, the cylindrical wave scattering response, and the plane wave scattering amplitude are greatly simplified. Those skilled in the art will recognize that the steps of determining the cylindrical wave scattering response and generating the plane wave scattering amplitude can be combined into a single integral transform relating the cylindrical wave scattering response directly to the scattering amplitude.

As an alternative to determining the plane wave scattering amplitude from the cylindrical wave response and processing with the plane wave arbitrary surface filtered backpropagation technique, a true fan beam filtered backpropagation technique which operates directly on the measured cylindrical wave scattering response is seen in FIG. 4. After the usual preprocessing by an analog circuitry and buffer memory 72, an analog to digital converter 74, and a Fourier transformer 75, the scattered field is calculated at 76 within the Born approximation as in (8) above. If surfaces $\Sigma_o$ and $\Sigma'$ are infinite lines, a partial reconstruction of the object profile may then be determined at 85 according to the filtered backpropagation technique:

$$\hat{O}(\underline{r};l_0) = \int_{-\infty}^{\infty} d\Gamma \psi(\Gamma;l_0) G_p(\underline{r};\Gamma;l_0) \quad (17)$$

where $$G_p(\underline{r};\Gamma;l_0) = \frac{-ik^4}{2(2\pi)^2} \int_{-\pi}^{\pi} d\chi_0 \int_{-\pi}^{\pi} d\chi(\hat{n}_0 \cdot \quad (18)$$

$$\underline{s}_0)(\hat{n} \cdot \underline{s}) \sqrt{1 - (\underline{s} \cdot \underline{s}_0)^2} \, e^{ik\underline{s}(\underline{r}-\Gamma)} e^{-ik\underline{s}_0(\underline{r}-\underline{R}_0)}$$

In order to obtain a full reconstruction, a sum of the partial reconstructions is performed at 90 by integrating over the source point locations $l_0$. Thus, $$O(\underline{r}) = \int_{-\infty}^{\infty} dl_0 \hat{O}(\underline{r};l_0) \quad (19)$$

Where surfaces 15, and 20 are circles, the filtered backpropagation technique takes the form of:

$$O(\underline{r}) = \int_{-\pi}^{\pi} d\beta \int_{-\infty}^{\infty} d\sigma \psi(\sigma;\beta) G_c(\underline{r};\sigma;\beta) \quad (20)$$

where $$G_c(\underline{r};\sigma;\beta) = \frac{2ik^2}{(2\pi)^2} \int_{-\pi}^{\pi} d\chi_0 \int_{-\pi}^{\pi} d\chi \sqrt{1 - (\underline{s} \cdot \underline{s}_0)^2} \, F_R(\chi - \quad (21)$$

$$\sigma) F_{R_0}(\beta - \chi_0) e^{ik(\underline{s}-\underline{s}_0) \cdot \underline{r}}$$

with $\sigma$ and $\beta$ representing, respectively, the angles formed by $\underline{r}'$ and $\underline{R}_o$ with an arbitrary reference direction, and with $F_R$ being defined as in (5) above. Here, R is the radius of the detector boundary 20, and $R_o$ is the radius of the source boundary 15.

Finally, where surfaces 15 and 20 are arbitrary but have weak curvature as described with regard to the plane wave arbitrary surface filtered backpropagation technique, a full reconstruction can be approximated by:

$$O(\underline{r}) \approx \int_{-\infty}^{\infty} dl_0 \int_{-\infty}^{\infty} d\Gamma \psi(\underline{r}';\underline{R}_0) G_p(\underline{r};\underline{r}';\underline{R}_0) \quad (22)$$

where $G_p(\underline{r};\underline{r}',\underline{R}_o)$ is set equal to (18) above.

Those skilled in the art should understand that the fan beam filtered backpropagation techniques (17), (20), and (22) disclosed above, are derived by substituting the derived scattering amplitude of the cylindrical source embodiments into the inversion formula $$O(\underline{r}) = \frac{1}{2(2\pi)^2} \int_{-\pi}^{\pi} d\chi_0 \int_{-\pi}^{\pi} d\chi \sqrt{1 - (\underline{s} \cdot \underline{s}_0)^2} \, \gamma(\underline{s},\underline{s}_0) e^{ik(\underline{s}-\underline{s}_0) \cdot \underline{r}} \quad (23)$$

disclosed by the inventor in Devaney, A. J., A Filtered Backpropagation Algorithm for Diffraction Tomography, *Ultrasonic Imaging* 4, 336-350 (1982), and reorganizing the result. The interesting outcome is that the derived filtered backpropagation techniques operate directly on the measured cylindrical wave scattering response without the step of determining the plane wave scattering amplitude required by the second embodiment herein, and that a full reconstruction is obtained by summing over source points rather than over angles; i.e. a true fan beam tomographic procedure.

While the three embodiments described herein implicitly assume a two-dimensional object whose properties are constant in one direction, those skilled in the art will appreciate that the embodiments are readily extended to three-dimensional objects. Thus, as would be suggested by Ser. No. 441,323, measurement boundary 15 may be replaced by a surface formed by sweeping the boundary 15 along the perpendicular to the plane in which boundary 15 lies. Thus, for example, a circular cylinder would replace a circular boundary while a plane surface would replace a line boundary. The three-dimensional object may then be reconstructed by projecting the scattered field measurements performed along the surface boundary onto the boundary 15 and performing the preprocessing and filtered backpropagation techniques described above for the appropriate situation. The resulting reconstruction will be of a projection of the three-dimensional object profile onto the plane formed by surface 15. Thus, as described in Ser. No. 441,323, in order to obtain a full three-dimensional reconstruction, insonification will have to be repeated with measurement surfaces having different orientations relative to the object, e.g. rotation of the object or of the sources.

Alternatively, three-dimensional reconstructions can be obtained by generalizing the fundamental relationships, transforms, etc., set forth above. For example, the inversion formula (23) may be extended to three dimensions by:

$$\hat{O}(r) = \frac{1}{(2\pi)^4} \int d\Omega_s \int d\Omega_{s_0} \, \underline{s} - \underline{s}_0 \, \gamma(\underline{s};\underline{s}_0) e^{ik(\underline{s}-\underline{s}_0)\cdot\underline{r}} \quad (24)$$

where $d\Omega_s$ and $d\Omega_{s_0}$ are differential solid angles and the integrals are over $4\pi$ steradians. By employing (24) together with the appropriate three-dimensional generalization of the expressions for the scattering amplitude, three-dimensional filtered backpropagation techniques analogous to techniques (17), (20), and (22), can be obtained.

There has been described and illustrated herein, methods and systems in accordance with the present invention for reconstructing object profiles according to diffraction tomographic procedures using filtered backpropagation techniques, wherein the sources and detectors of energy may be located along arbitrary surfaces. While particular embodiments of the invention have been described, it is not intended that the invention be limited thereby, as it is intended that the invention be broad in scope and that the specifications be read likewise. Thus, those skilled in the art will recognize that some of the described method steps may be combined, or divided with no resulting change in the outcome. Likewise, those skilled in the art will appreciate that the measurement surface of the system can be changed for each source pulse insonification by redefining the vectors. Again, if properly done, no changes in outcome will result. Further, it should be readily understood that while the specification has disclosed certain simplifying embodiments such as the cases where both the source and detector surfaces are circular or of simple geometry, it is not intended that the invention be limited in its simplifying embodiments. Thus, for example, if the source surface is arbitrary, while the detector surface is circular, certain simplifications will result, and the invention, as claimed, is intended to encompass such embodiments. Therefore, it will be apparent to those skilled in the art that other changes and modifications may be made to the invention as described in the specification without departing from the spirit and scope of the invention as so claimed.

I claim:

1. A method for the tomographic reconstruction of an object which has diffracted waves of energy propagating through it, said waves of energy being selected from a group consisting of sonic and electromagnetic waves, comprising:
   obtaining signals which are a function of at least one of the phase and amplitude of the diffracted propagating waves after said waves have interacted with said object, wherein the sources of said energy waves are located along an arbitrary curvilinear surface, and the detectors of said diffracted waves are located along an arbitrary curvilinear surface other than a single straight line; and
   converting said signals by means of a filtered backpropagation technique into an array representing a partial reconstruction of the object.

2. A method according to claim 1 further comprising:
   preprocessing said obtained signals before said converting step wherein said signals converted by said converting step are preprocessed signals, and wherein said preprocessing includes transforming said obtained signals with a general transform.

3. A method according to claim 2 wherein:
   said sources of energy are plane wave sources; and
   said general transform transforms a determined scattered field into a plane wave scattering amplitude for input into said filtered backpropagation technique.

4. A method according to claim 3 wherein:
   said preprocessed signals are filtered according to the filtered backpropagation technique $$\hat{O}(r;\chi_0) = \frac{k^2}{4\pi} \int_{-\pi}^{\pi} d\chi \sqrt{1 - (\underline{s}\cdot\underline{s}_0)^2} \, \gamma(\underline{s};\underline{s}_0) e^{ik\underline{s}\cdot\underline{r} - i0^+ \underline{r}}$$

wherein $\underline{s}_0$ is a unit propagation vector of the incident plane waves, $\underline{s}$ is a unit vector which may assume all directions, r is the vector from a coordinate system origin to a particular point of reconstruction in said coordinate system, $\gamma(\underline{s};\underline{s}_0)$ is the plane wave scattering amplitude, $\chi$ and $\chi_o$ are respectively the angles formed by $\underline{s}$ and $\underline{s}_o$ with a fixed reference direction, and $\hat{O}(r;\chi_0)$ is the partial reconstruction of the object.

5. A method according to claim 4 wherein said object is two-dimensional further comprising:
   summing said partial reconstructions over a plurality of view angles to obtain a full two-dimensional reconstruction of said object.

6. A method according to claim 5 wherein:
   said detectors are located along a circular boundary.

7. A method according to claim 6 wherein:
   said energy sources are located along a circular boundary.

8. A method according to claim 5 wherein:
   said detectors are located along a boundary of weak curvature.

9. A method according to claim 5 wherein:
   said detectors are located along a boundary which approximates two infinite parallel lines.

10. A method according to claim 4 wherein said preprocessing further comprises:
   transforming said obtained signals from analog to digital form;
   Fourier transforming said digital signals in time; and
   determining the scattered field from said Fourier tansformed signals.

11. A method according to claim 2 wherein:
   said sources of energy are cylindrical or spherical wave sources;
   said general transform transforms a scattered field into a cylindrical wave response; and
   said cylindrcial wave response is slant stacked to provide the plane wave scattering amplitude for input into said filtered backpropagation technique.

12. A method according to claim 11 wherein:
   said preprocessed signals are filtered according to the filtered backpropagation technique $$\hat{O}(\underline{r};\chi_o) = \frac{k^2}{4\pi} \int_{-\pi}^{\pi} d\chi \sqrt{1 - (\underline{s}\cdot\underline{s}_o)^2} \, \gamma(\underline{s};\underline{s}_o) e^{ik(\underline{s}-\underline{s}_o)\cdot\underline{r}}$$

wherein $\underline{s}_o$ is a unit propagation vector of the incident waves, $\underline{s}$ is a unit vector which may assume all directions, $\underline{r}$ is the vector from the origin of a coordinate system to a particular point of reconstruction in said coordinate system, $\gamma(\underline{s};\underline{s}_o)$ is the plane wave scattering amplitude, $\chi$ and $\chi_o$ are respectively the angles formed by $\underline{s}$ and $\underline{s}_o$ with a fixed reference direction, and $\hat{O}(\underline{r};\chi_o)$ is the partial reconstruction of the object.

13. A method according to claim 12 wherein said object is two-dimensional further comprising:
   summing said partial reconstructions over a plurality of view angles to obtain a full two-dimensional reconstruction of said object.

14. A method according to claim 13 wherein said preprocessing further comprises:
   transforming said obtained signals from analog to digital form;
   Fourier transforming said digital signals in time; and
   determining the scattered field from said Fourier tansformed signals.

15. A method according to claim 14 wherein:
   said detectors are located along a circular boundary.

16. A method according to claim 15 wherein:
   said energy sources are located along a circular boundary.

17. A method according to claim 14 wherein:
   said detectors are located along a boundary of weak curvature.

18. A method according to claim 14 wherein:
   said detectors are located along a boundary which approximates two infinite parallel lines.

19. A method according to claim 1 further comprising:
   preprocessing said obtained signals before said converting step wherein said signals converted by said converting step are preprocessed signals.

20. A method according to claim 19 wherein said sources of energy are cylindrical or spherical wave sources and said proprocessing comprises:
   transforming said obtained signals from analog to digital form;
   Fourier transforming said digital signals in time; and
   determining the scattered field from said Fourier transformed signals.

21. A method according to claim 20 further comprising:
   summing said partial reconstructions to obtain a full reconstruction by integrating over the point locations of said sources.

22. A method according to claim 20 wherein:
   said object is two-dimensional;
   said sources and detectors are located along circular boundaries; and
   said scattered field is filtered according to a filtered backpropagation technique $$\hat{O}(\underline{r};\beta) = \int_{-\infty}^{\infty} d\sigma \psi(\sigma;\beta) G_c(\underline{r};\sigma;\beta)$$

where $$G_c(\underline{r};\sigma;\beta) = \frac{2ik^2}{(2\pi)^2} \int_{-\pi}^{\pi} d\chi_o \int_{-\pi}^{\pi} d\chi \sqrt{1 - (\underline{s}\cdot\underline{s}_o)^2} \, F_R(\chi - \sigma) F_{R_o}(\beta - \chi_o) e^{ik(\underline{s}-\underline{s}_o)\cdot\underline{r}}$$

and wherein $\hat{O}(\underline{r},\beta)$ is a partial reconstruction of said object, $\underline{r}$ is the vector from the origin of a coordinate system to a particular point of reconstruction in the coordinate system, $\beta$ is the angle formed by $\underline{R}_o$ with an arbitrary reference where $\underline{R}_o$ is the cylindrical or spherical wave source location, $\sigma$ is the angle made by $\underline{r}'$ with an arbitrary reference direction where $\underline{r}'$ is a detector point location, $\Psi(\sigma,\beta)$ is the scattered field, $\chi$ and $\chi_o$ are respectively the angles formed by $\underline{s}$ and $\underline{s}_o$ with fixed reference directions where $\underline{s}$ is a unit vector which may assume all directions and $\underline{s}_o$ is a unit propagation vector of the incident waves, and $F_R$ is a function given by $$F_R(\chi) = \frac{1}{(2\pi)^2} \sum_{n=0}^{\infty} \frac{i^n}{H_n(kR)} e^{in\chi}$$

where $H_n$ is the n'th order Hankel function of the first kind, and k is the wave numbeer, and R is the radius of the detector boundary and $R_o$ is the radius of the source boundary.

23. A method according to claim 20 wherein:
   said object is two-dimensional;
   said detectors are located along a boundary which approximates two infinite parallel lines; and
   said scattered field is filtered according to a filtered backpropagation technique $$\hat{O}(\underline{r},l_o) = \int_{-\infty}^{\infty} dl' \psi(l';l_o) G_p(\underline{r};l';l_o)$$

where $$G_p(\underline{r};l';l_o) = \frac{-ik^4}{2(2\pi)^2} \int_{-\pi}^{\pi} d\chi_o \int_{-\pi}^{\pi} d\chi (\hat{n}_o \cdot \underline{s}_o)(\hat{n}_o \cdot \underline{s}) \sqrt{1 - (\underline{s}\cdot\underline{s}_o)^2} \, e^{ik(\underline{s}(\underline{r}-\underline{r}')} e^{-ik\underline{s}_o(\underline{r}-\underline{R}_o)}$$

and wherein $\hat{O}(\underline{r},l_o)$ is a partial reconstruction of said object, $\underline{r}$ is the vector from the origin of a coordinate system to a particular point of reconstruction in the coordinate system, $l_o$ is the location of $\underline{R}_o$ along a straight boundary line where $\underline{R}_o$ is the cylindrical or spherical wave source location, l' is the location of r' along the detector surface boundary where r' is the detector point location, $\Psi(l';l_o)$ is the scattered field, $\chi$ and $\chi_o$ are respectively the angles formed by s and $s_o$ with fixed reference directions where s is a unit vector which may assume all directions and $s_o$ is a unit propagation vector of the incident waves, $\hat{n}'$ is the unit outward normal vector to the detecting surface, and $\hat{n}_o$ is the unit outward normal vector to the source surface.

24. A method according to claim 20 wherein:
said object is two-dimensional;
said detectors are located along a boundary of weak curvature; and
said scattered field is filtered according to a filtered backpropagation technique $$\hat{O}(\underline{r};l_o) = \int_{-\infty}^{\infty} dl' \psi(\underline{r}';\underline{R}_o) G_p(\underline{r};\underline{r}';\underline{R}_o)$$

where $$G_p(\underline{r};\underline{r}';\underline{R}_o) = \frac{-ik^4}{2(2\pi)^2} \int_{-\pi}^{\pi} d\chi_o \int_{-\pi}^{\pi} d\chi (\hat{n}_o \cdot \underline{s}_o) (\hat{n}' \cdot \underline{s}) \sqrt{1 - (\underline{s} \cdot \underline{s}_o)^2} \, e^{ik\underline{s}(\underline{r}-\underline{r}')} e^{-ik\underline{s}_o(\underline{r}'-\underline{R}_o)}$$

and wherein $\hat{O}(\underline{r},l_o)$ is a partial reconstruction of said object, r is the vector from the origin of a coordinate system to a particular point in the coordinate system, $l_o$ is the location of $\underline{R}_o$ along a straight boundary line where $\underline{R}_o$ is the cylindrical or spherical wave source location, l' is the location of r' along the detector surface boundary where r' is the detector point location, $\Psi(\underline{r}';\underline{R}_o)$ is the scattered field, $\chi$ and $\chi_o$ are respectively the angles formed by s and $s_o$ with fixed reference directions where s is a unit vector which may assume all directions and $s_o$ is a unit propagation vector of the incident waves, $\hat{n}'$ is the unit outward normal vector to the detecting surface, and $\hat{n}_o$ is the unit outward normal vector to the source surface.

25. A method for the tomographic reconstruction of an object comprising:
directing, from energy sources located along an arbitrary curvilinear surface, waves of energy toward said object;
detecting as a function of time, with detectors located along an arbitrary curvilinear surface other than a single straight line, the fields produced by said waves;
producing signals which are functions of said detected fields;
preprocessing said produced signals; and
filtering said preprocessed signals according to a filtered backpropagation technique to generate an array representing a partial reconstruction of said object.

26. A method according to claim 25 wherein:
said preprocessed signals are filtered according to the filtered backpropagation technique $$\hat{O}(\underline{r};\chi_o) = \frac{k^2}{4\pi} \int_{-\pi}^{\pi} d\chi \sqrt{1 - (\underline{s} \cdot \underline{s}_o)^2} \, \gamma(\underline{s};\underline{s}_o) e^{ik(\underline{s}-\underline{s}_o)\cdot\underline{r}}$$

wherein $s_o$ is a unit propagation vector of the incident waves, s is a unit vector which may assume all directions, r is the vector from the origin of a coordinate system to a particular point of reconstruction in said coordinate system, $\gamma(\underline{s};\underline{s}_o)$ is the plane wave scattering amplitude, $\chi$ and $\chi_o$ are respectively the angles formed by s and $s_o$ with a fixed reference direction, and $\hat{O}(\underline{r};\chi_o)$ is the partial reconstruction of the object.

27. A method according to claim 26 wherein said object is a two-dimensional object, further comprising:
summing said partial reconstructions over a plurality of view angles to obtain a full two-dimensional reconstruction of said object.

28. A method according to claim 26 wherein said sources of energy are plane wave sources, and said preprocessing step comprises:
transforming said produced signals from analog to digital form;
Fourier transforming said digital signals in time;
determining the scattered field from said Fourier transformed signals; and
determining the plane wave scattering amplitude by transforming said scattered field with a general transform.

29. A method according to claim 28 wherein:
said detectors and sources are located along circular boundaries.

30. A method according to claim 28 wherein:
said detectors and sources are located along boundaries of weak curvature.

31. A method according to claim 28 wherein:
said detectors and sources are located along boundaries which approximate two infinite parallel lines.

32. A method according to claim 26 wherein said sources of energy are cylindrical or spherical wave sources and said preprocessing step comprises:
transforming said produced signals from analog to digital form;
Fourier transforming said digital signals in time;
determining the scattered field from said Fourier transformed signals;
transforming the scattered field into a cylindrical wave response according to a general transform; and
determining the plane wave scattering amplitude by slant stacking said cylindrical wave response.

33. A method according to claim 32 wherein:
said detectors and sources are located along circular boundaries.

34. A method according to claim 32 wherein:
said detectors and sources are located along boundaries of weak curvature.

35. A method according to claim 32 wherein
said detectors and sources are located along boundaries which approximate two infinite parallel lines.

36. A method according to claim 25 wherein said sources of energy are cylindrical or spherical wave sources and said preprocessing comprises:
transforming said produced signals from analog to digital form;
Fourier transforming said digital signals in time; and
determining the scattered field from said Fourier transformed signals.

37. A method according to claim 36 further comprising:
summing said partial reconstructions by integrating over the point locations of said sources of energy to obtain a full reconstruction of said object.

38. A method according to claim 36 wherein:

said sources and detectors are located along circular boundaries; and said scattered field is filtered according to the filtered backpropagation technique $$\hat{O}(\underline{r};\beta) = \int_{-\infty}^{\infty} d\sigma \psi(\sigma;\beta) G_c(\underline{r};\sigma;\beta)$$

where $$G_c(\underline{r};\sigma;\beta) = \frac{2ik^2}{(2\pi)^2} \int_{-\pi}^{\pi} d\chi_o \int_{-\pi}^{\pi} d\chi \sqrt{1 - (\underline{s} \cdot \underline{s}_o)^2} \; F_R(\chi - \sigma) F_{R_o}(\beta - \chi_o) e^{ik(\underline{s} - \underline{s}_o)\underline{r}}$$

and wherein $\hat{O}(\underline{r},\beta)$ is a partial reconstruction of said object, $\underline{r}$ is the vector from the origin of a coordinate system to a particular point located in said coordinate system, $\beta$ is the angle formed by $\underline{R}_o$ with an arbitrary reference where $\underline{R}_o$ is the cylindrical or spherical wave source location, $\sigma$ is the angle made by $\underline{r}'$ with arbitrary reference direction where $\underline{r}'$ is a detector point location, $\Psi(\sigma,\beta)$ is the scattered field, $\chi$ and $\chi_o$ are respectively the angles formed by $\underline{s}$ and $\underline{s}_o$ with fixed reference directions where s is a unit vector which may assume all directions and $\underline{s}_o$ is a unit propagation vector of the incident waves, and $F_R$ is a function given by $$F_R(x) = \frac{1}{(2\pi)^2} \sum_{n=0}^{\infty} \frac{i^n}{H_n(kR)} e^{inx}$$

where $H_n$ is the n'th order Hankel function of the first kind, and k is the wavenumber, and R is the radius of the detector boundary and R is the radius of the source boundary.

39. A method according to claim 36 wherein:
said detectors are located along a boundary which approximates two infinite parallel lines; and
said scattered field is filtered according to the filtered backpropagation technique $$\hat{O}(\underline{r},l_o) = \int_{-\infty}^{\infty} dl' \psi(l';l_o) G_p(\underline{r};l';l_o)$$

where $$G_p(\underline{r};l';l_o) = \frac{-ik^4}{2(2\pi)^2} \int_{-\pi}^{\pi} d\chi_o \int_{-\pi}^{\pi} d\chi (\hat{\underline{n}}_o \cdot \underline{s}_o)(\hat{\underline{n}}' \cdot \underline{s}) \sqrt{1 - (\underline{s} \cdot \underline{s}_o)^2} \; e^{ik\underline{s}\cdot(\underline{r}-\underline{r}')}e^{-ik\underline{s}_o\cdot(\underline{r}-\underline{R}_o)}$$

and wherein $\hat{O}(\underline{r},l_o)$ is a partial reconstruction of said object, $\underline{r}$ is the vector from the origin of a coordinate system to a particular point in the coordinate system, $l_o$ is the location of $\underline{R}_o$ along a straight boundary line where $\underline{R}_o$ is the cylindrical or spherical wave source location, $l'$ is the location of $\underline{r}'$ along the detector surface boundary where $\underline{r}'$ is the detector point location, $\Psi(l_o;l')$ is the scattered field, $\chi$ and $\chi_o$ are respectively the angles formed by $\underline{s}$ and $\underline{s}_o$ with fixed reference directions where $\underline{s}$ is a unit vector which may assume all directions and $\underline{s}_o$ is a unit propagation vector of the incident waves, $\hat{\underline{n}}'$ is the unit outward normal vector to the detecting surface, and $\hat{\underline{n}}_o$ is the unit outward normal vector to the source surface.

40. A method according to claim 36 wherein:
said detectors are located along a boundary of weak curvature; and
said scattered field is filtered according to a filtered backpropagation technique $$\hat{O}(\underline{r},l_o) = \int_{-\infty}^{\infty} d l' \psi(\underline{r}';\underline{R}_o) G_p(\underline{r};\underline{r}';\underline{R}_o)$$

where $$G_p(\underline{r};\underline{r}';\underline{R}_o) = \frac{-ik^4}{2(2\pi)^2} \int_{-\pi}^{\pi} d\chi_o \int_{-\pi}^{\pi} d\chi (\hat{\underline{n}}_o \cdot \underline{s}_o)(\hat{\underline{n}}' \cdot \underline{s}) \sqrt{1 - (\underline{s} \cdot \underline{s}_o)^2} \; e^{ik\underline{s}\cdot(\underline{r}-\underline{r}')}e^{-ik\underline{s}_o\cdot(\underline{r}-\underline{R}_o)}$$

and wherein $\hat{O}(\underline{r},l_o)$ is a partial reconstruction of said object, $\underline{r}$ is the vector from the origin of a coordinate system to a particular point in said coordinate system, $l_o$ is the location of $\underline{R}_o$ along a straight boundary line where $\underline{R}_o$ is the cylindrical or spherical wave source location, $l'$ is the location of $\underline{r}'$ along the detector surface boundary where $\underline{r}'$ is the detector point location, $\Psi(\underline{r}';\underline{R}_o)$ is the scattered field, $\chi$ and $\chi_o$ are respectively the angles formed by $\underline{s}$ and $\underline{s}_o$ with fixed reference directions where $\underline{s}$ is a unit vector which may assume all directions and $\underline{s}_o$ is a unit propagation vector of the incident waves, $\hat{\underline{n}}'$ is the unit outward normal vector to the detecting surface, and $\hat{\underline{n}}_o$ is the unit outward normal vector to the source surface.

41. A system for the tomographic reconstruction of an object comprising:
energy sources located along an arbitrary curvilinear surface for insonifying said object with waves of energy;
detectors of energy located along an arbitrary curvilinear surface other than a single straight line, for detecting the fields produced by the interaction of said source energy with said object and for producing signals which are functions of said detected fields;
preprocessing means for preprocessing said produced signals; and
processing means for filtering and backpropagating said preprocessed signals according to a filtered backpropagation technique to generate an array representing a partial reconstruction of said object.

42. A system according to claim 41 wherein:
said processing means includes means for filtering and backpropagating said preprocessed signals according to the filtered backpropagation technique $$\hat{O}(\underline{r};\chi_o) = \frac{k^2}{4\pi} \int_{-\pi}^{\pi} d\chi \sqrt{1 - (\underline{s} \cdot \underline{s}_o)^2} \; \gamma(\underline{s};\underline{s}_o) e^{ik(\underline{s}-\underline{s}_o)\underline{r}}$$

wherein $\underline{s}_o$ is a unit propagation vector of the incident waves, $\underline{s}$ is a unit vector which may assume all directions, $\underline{r}$ is the vector from the origin of a coordinate system to a particular point of reconstruction in said coordinate system, $\gamma(\underline{s};\underline{s}_o)$ is the plane wave scattering amplitude, $\chi$ and $\chi_o$ are respectively the angles formed by $\underline{s}$ and $\underline{s}_o$ with a fixed reference direction, and $\hat{O}(\underline{r};\chi_o)$ is the partial reconstruction of the object.

* * * * *